United States Patent [19]

Amano et al.

[11] 4,363,097

[45] Dec. 7, 1982

[54] ELECTRONIC TYPE ENGINE CONTROL METHOD

[75] Inventors: Matsuo Amano; Masumi Imai; Toru Sugawara; Shinichi Sakamoto, all of Hitachi; Masayuki Miki, Katsuta; Takao Sasayama, Hitachi, all of Japan

[73] Assignee: Hitachi, Ltd., Tokyo, Japan

[21] Appl. No.: 138,086

[22] Filed: Apr. 7, 1980

[30] Foreign Application Priority Data

Apr. 6, 1979 [JP] Japan .................. 54-40934

[51] Int. Cl.³ .................. G05B 15/02; G06F 9/46; G11C 7/00
[52] U.S. Cl. .................. 364/431.11; 123/489; 364/431.06; 364/900
[58] Field of Search ............ 364/426, 431, 200, 900; 123/480, 486, 489

[56] References Cited

U.S. PATENT DOCUMENTS

| 3,825,902 | 7/1974 | Brown et al. | 364/200 |
|---|---|---|---|
| 3,905,025 | 9/1975 | Davis et al. | 364/200 |
| 4,001,783 | 1/1977 | Monahan et al. | 364/200 |
| 4,005,391 | 1/1977 | MacPherson | 364/200 |
| 4,091,447 | 5/1978 | Dillon et al. | 364/200 |
| 4,096,564 | 6/1978 | Inose et al. | 364/200 |
| 4,152,761 | 5/1979 | Louie | 364/200 |
| 4,231,091 | 10/1980 | Motz | 364/431 |
| 4,245,317 | 1/1981 | Marchak | 364/431 |
| 4,255,789 | 3/1981 | Hartford et al. | 364/431 |

FOREIGN PATENT DOCUMENTS

| 2841750 | 4/1980 | Fed. Rep. of Germany | 364/431 |
|---|---|---|---|
| 54-130734 | 10/1979 | Japan | 123/480 |

OTHER PUBLICATIONS

Korn: (Textbook) Microprocessors and Small Digital Computer Systems for Engineers and Scientists. McGraw Hill Book Co. 1977, pages of interest: 2, 3, 140-155, 260-271.

Primary Examiner—Felix D. Gruber
Attorney, Agent, or Firm—Antonelli, Terry and Wands

[57] ABSTRACT

A method of controlling, electronically, the operation of an internal combustion engine on the basis of results of arithmetic operations of digital control quantities derived from detected operating conditions of the engine through digital processing operations. The digital processing operations are divided into a number of tasks in dependence on the control functions to be performed. The method comprises a step of setting an activation request indication for a task through the execution of another task, a step of setting an activation request indication for a task through execution of the task itself, a step of searching the activation request indications for the individual tasks, and a step of executing the tasks to which the activation requests are issued on the basis of the effects of the tasks.

71 Claims, 32 Drawing Figures

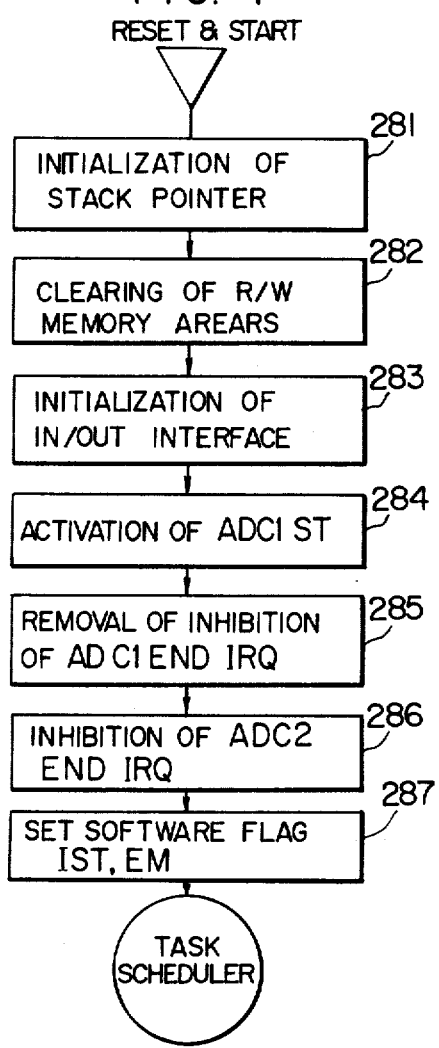
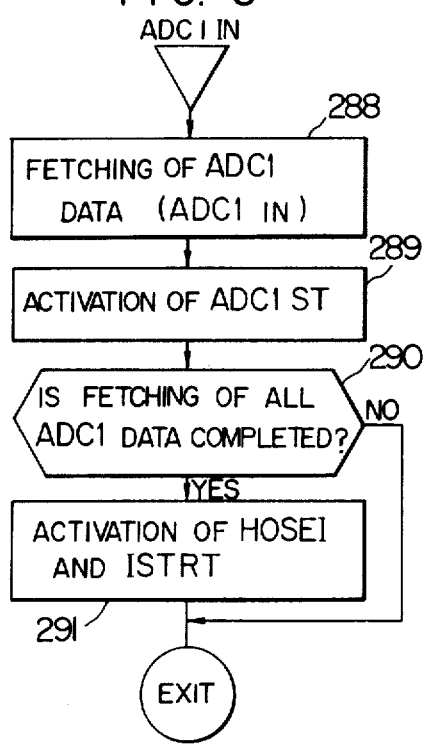
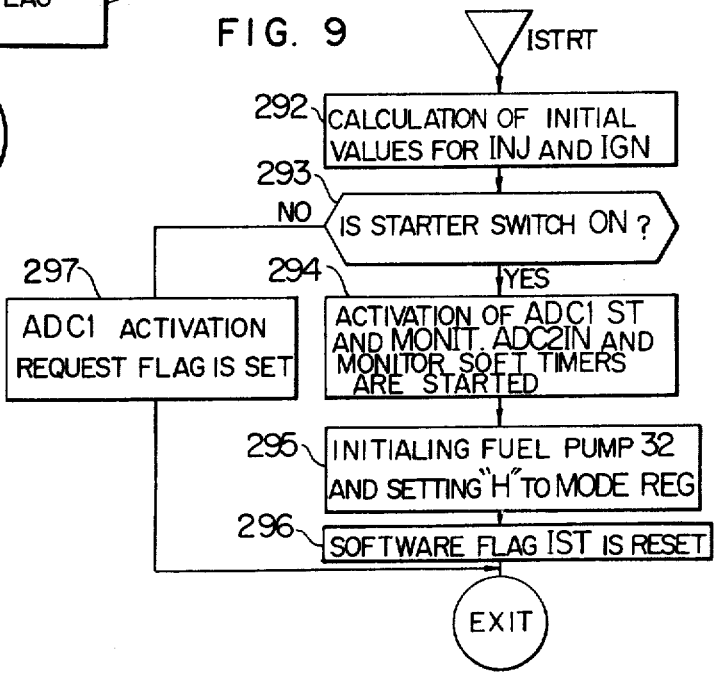

FIG. 22

| ADDRESS | | STORED CONTENTS |
|---|---|---|
| ↑ ADV MAP | B 500 | QA VALUE OF $x_0$ |
| | 1 | QA VALUE OF $x_1$ |
| | ⋮ | ⋮ |
| | n | QA VALUE OF $x_n$ |
| | ⋮ | ⋮ |
| | F | QA VALUE OF $x_{15}$ |
| | B 510 | N VALUE OF $y_0$ |
| | 1 | N VALUE OF $y_1$ |
| | ⋮ | ⋮ |
| | n | N VALUE OF $y_n$ |
| | ⋮ | ⋮ |
| | F | N VALUE OF $y_{15}$ |
| | B 520 | ADV VALUE AT $x_0 y_0$ |
| | 1 | ADV VALUE AT $x_1 y_0$ |
| | ⋮ | ⋮ |
| | n | ADV VALUE AT $x_n y_0$ |
| | ⋮ | ⋮ |
| ↑ AF MAP | B 600 | QA VALUE OF $x_0$ |
| | 1 | QA VALUE OF $x_1$ |
| | ⋮ | ⋮ |
| | n | QA VALUE OF $x_n$ |
| | ⋮ | ⋮ |
| | F | QA VALUE OF $x_{15}$ |
| | B 610 | N VALUE OF $y_0$ |
| | 1 | N VALUE OF $y_1$ |
| | ⋮ | ⋮ |
| | n | N VALUE OF $y_n$ |
| | ⋮ | ⋮ |
| | F | N VALUE OF $y_{15}$ |
| | B 620 | FUEL SUPPLY QUANTITY AT $x_0 y_0$ |
| | 1 | FUEL SUPPLY QUANTITY AT $x_1 y_0$ |
| | ⋮ | ⋮ |
| | n | FUEL SUPPLY QUANTITY AT $x_n y_0$ |
| | ⋮ | ⋮ |

FIG. 23
AF MAP

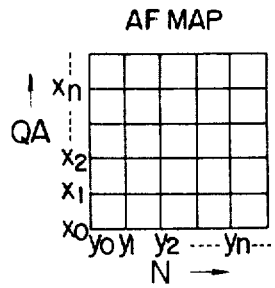

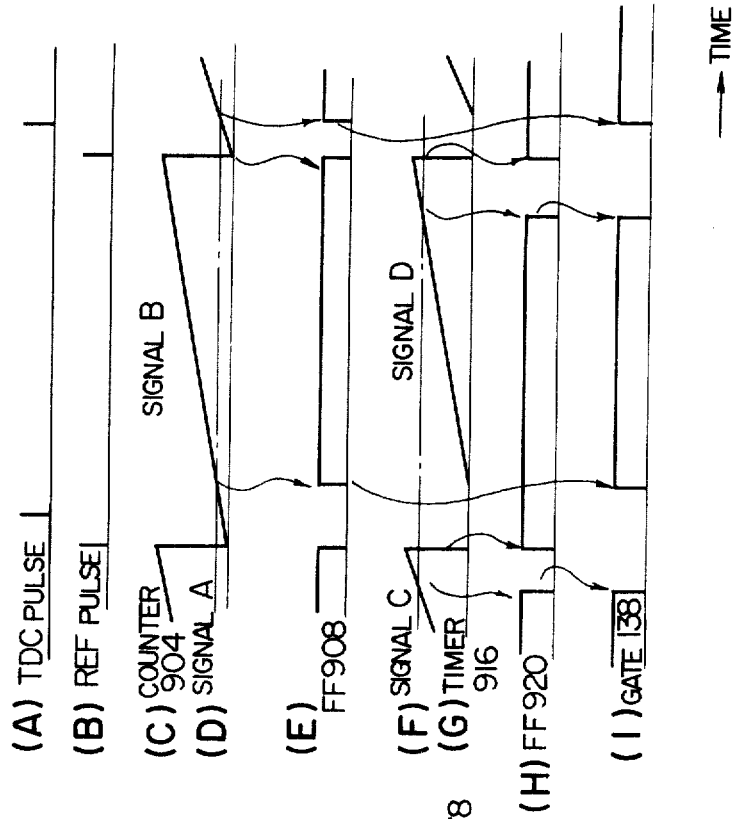
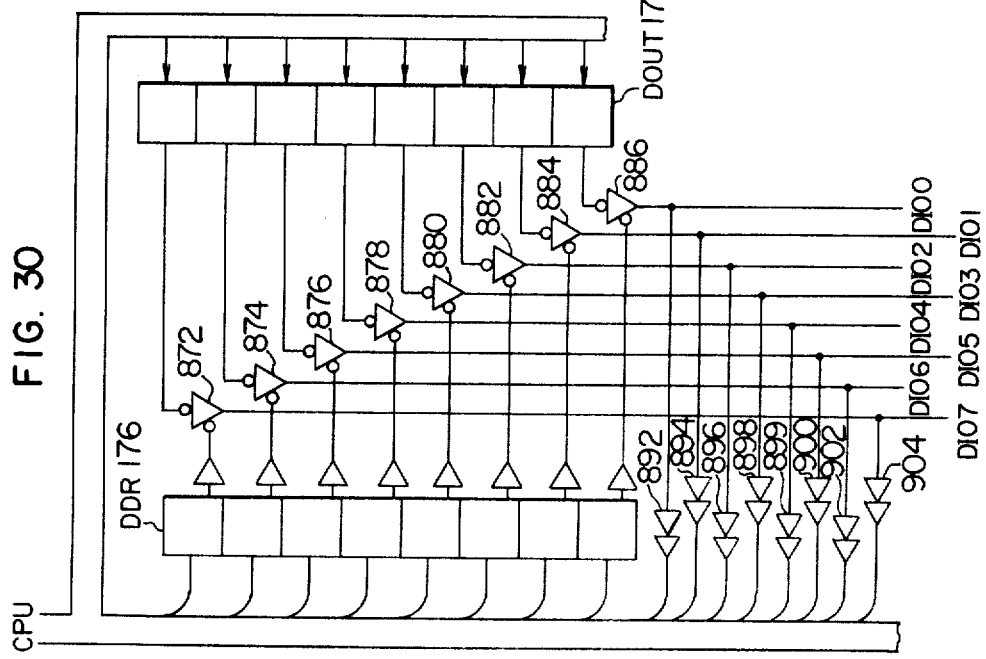

ELECTRONIC TYPE ENGINE CONTROL METHOD

The present invention relates to a method of electronically controlling the operation of an internal combustion engine and a system for carrying out the same. More particularly, the invention relates to an electronic type engine control method in which the internal combustion engine is controlled through digital processing operations and arithmetic operations by a programmed processor (more specifically its central processing unit, hereinafter referred to simply as CPU).

A method and a system for controlling the operation of an internal combustion engine (hereinafter simply referred to also as the engine) through the operation of a programmed processor, specifically its CPU are disclosed in U.S. Pat. Nos. 3,969,614 and 4,163,282. According to these prior art control techniques, a series of programs prepared for fetching information from various sensors for detecting engine operating conditions and setting control quantities for every function to be controlled are executed in accordance with the rotation of the engine crankshaft to thereby control the operation of the engine. Such control programs include a fuel quantity control program, an ignition timing program and an engine initiation program, for example. The fuel quantity control program and the ignition timing control program are executed in synchronism with the detection of a predetermined crank angle during rotation of the engine crankshaft, whereby signals representing the fuel supply quantity as well as the ignition timing advance angle which are arithmetically determined through the execution of the programs described above are supplied to associated pulse output circuits.

The control of the engine operation in which predetermined programs are executed in certain states of the engine operation and terminated upon the setting of the arithmetically determined data in the pulse output circuit or upon changing the operating state of the engine in the manner described above means that the load state of the central control unit or CPU undergoes remarkable variations in dependence on the operating conditions of the engine to a great disadvantage.

Accordingly, when the operating conditions change rapidly, the load imposed on the CPU will vary remarkably, involving a degradation in the serviceability of the CPU. Assuming, for example, that the operational speed of the engine varies from a low speed to an intermediate speed and then to a high speed, the number of requests for arithmetic operations issued to the CPU, i.e. the number of tasks to be executed, will be increased as the engine speed is increased, eventually resulting in the condition that it becomes difficult for the CPU to deal with the increased number of the requests. On the other hand, the load ratio of the CPU is decreased at a low speed operation of the engine, which means that the capability of CPU is not fully utilized. In this way, the hitherto known control method and system cannot provide control functions in a manner satisfactorily compatible with the processing capability of the CPU.

Further, when the contents of one of the plural control programs has to be altered and new programs have to be added, all the programs must be renewed in the case of the control systems disclosed in the patent specifications recited above.

In addition, there is provided no supervisory program for monitoring the execution of the plural control programs in the case of the prior art control system so that it was impossible to change the sequence of execution of the programs.

With a view to obviating the shortcomings described above, it has been proposed by the Assignee of the present application that the contents of the arithmetic operation be divided into a plurality of tasks in dependence on the processing contents of the CPU, while a supervisory program is provided for supervising or monitoring execution of the plurality of the tasks, wherein the individual tasks are associated with respective predetermined activation periods in dependence on the functions of the tasks, so that each of the tasks is executed every activation period or timing interval allotted thereto. It has been found, however, that the activation of the tasks at respective predetermined periods from the point in time at which the engine has been started results in a rather poor starting performance or behavior of the engine. In this connection, the inventors of the present application have discovered that activation of the tasks at a constant period or timing for all the tasks (hereinafter referred to as timer activation) is preferred over the activations of the tasks in accordance with the respective allotted timings when the cranking operation by the actuation of a starter motor has been completed. Accordingly, it is necessary to smoothly change a method of generating the task activation requests for the execution of the programs.

Accordingly, an object of the invention is to provide a method of assuring a smooth transition of the task activation to the timer activation.

Another object of the invention is to provide a control method according to which an activation request is issued, before the transition to the timer activation for smoothly controlling the engine at the start thereof.

Still another object of the invention is to provide a method of electronically controlling an internal combustion engine which assures a smooth engine control during the engine starting operation.

The above and other objects, features and advantages of the present invention will become more apparent from the following descriptions taken in conjunction with the accompanying drawings, in which:

FIG. 7 shows in detail a program INITIALIZE employed in carrying out the invention;

FIG. 8 shows details of a program ADC1 IN program;

FIG. 9 shows details of a program INSTRT;

Figure 4:
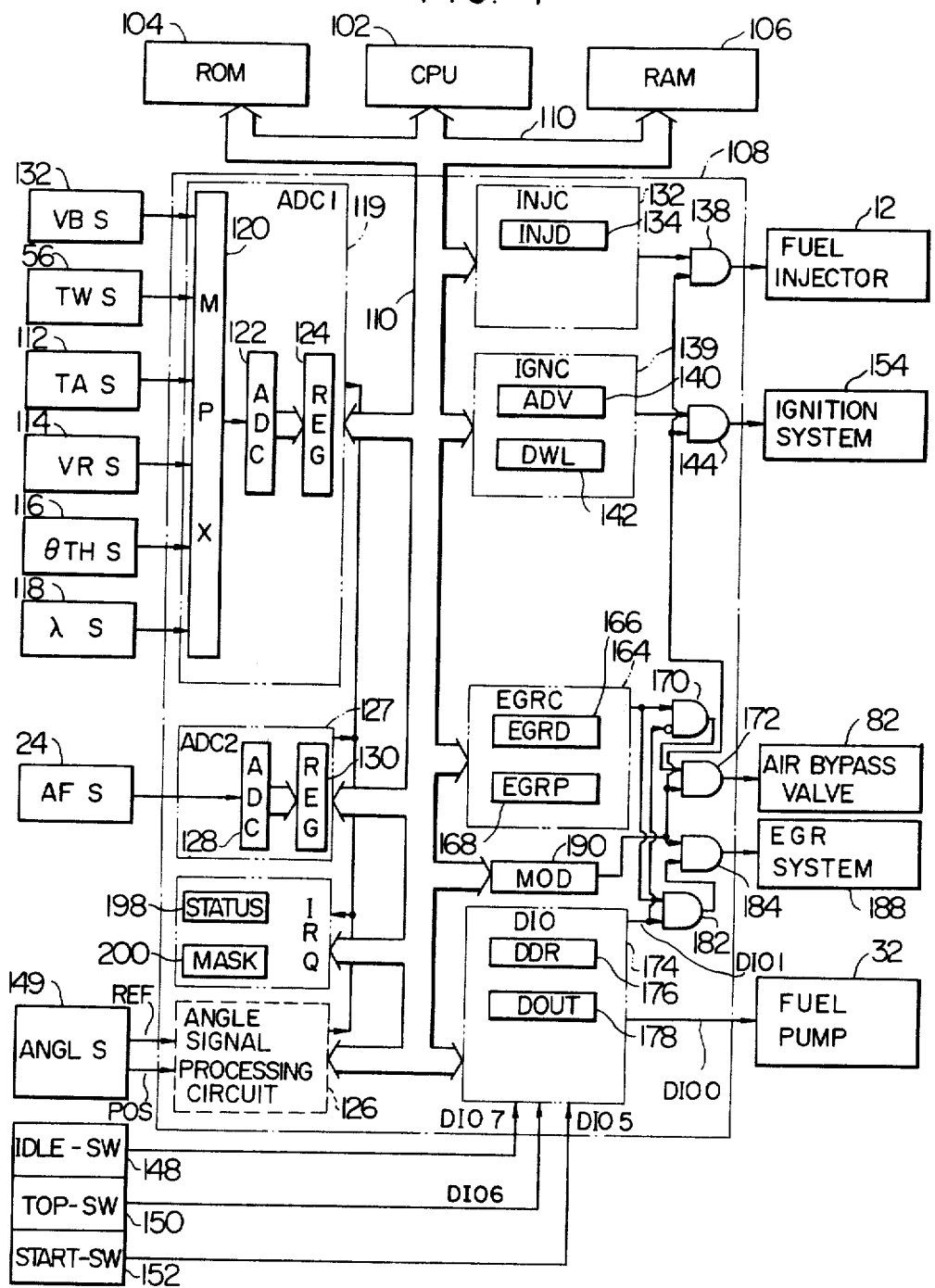
FIG. 4 shows, in a block diagram, a general arrangement of the control circuit 70 shown in FIG. 1.
Figure 5:
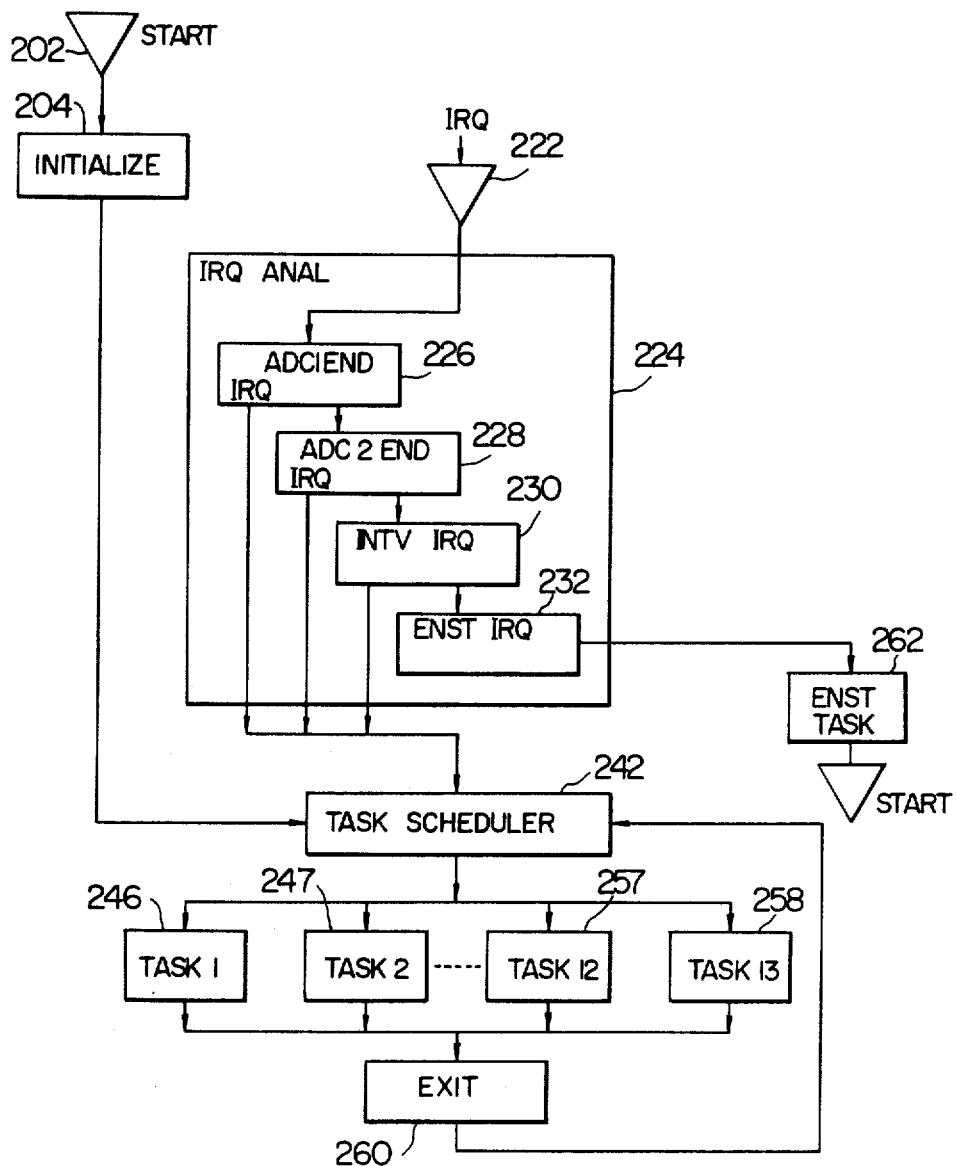
FIG. 5 shows schematically a program system for executing tasks.
Figure 10:
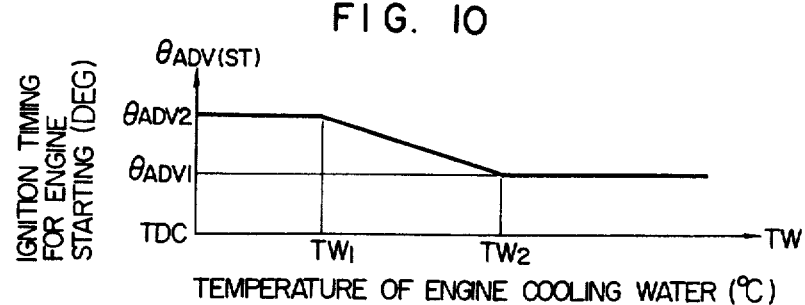
Figure 11:
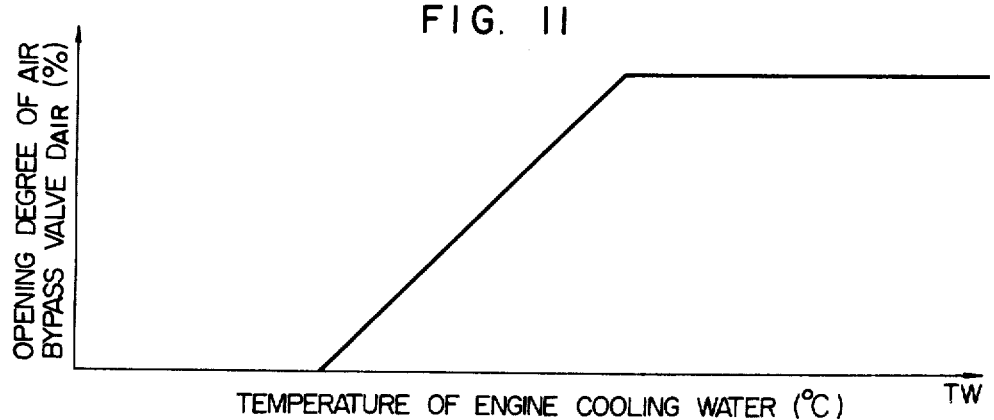
Figure 12:
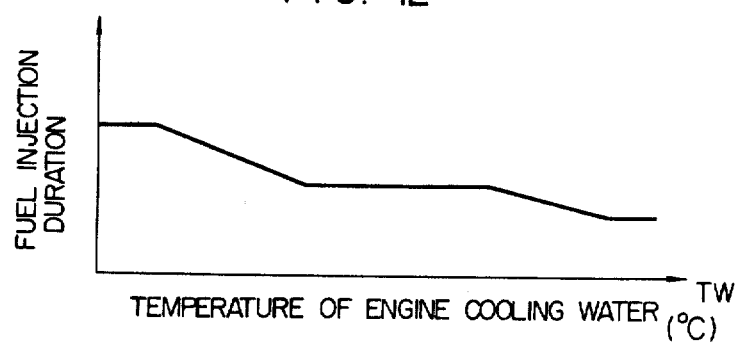
Figure 13:
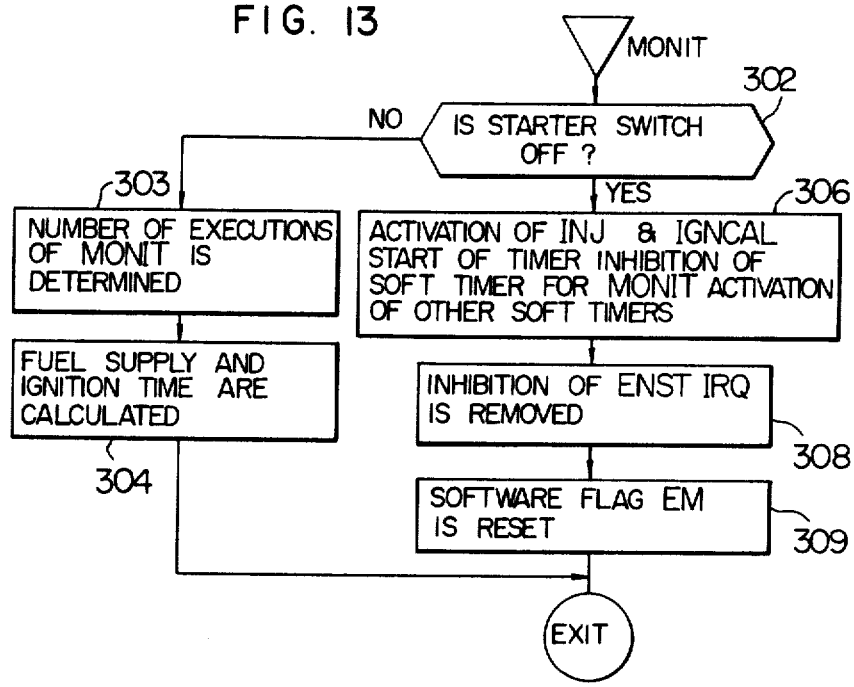
Figure 17:
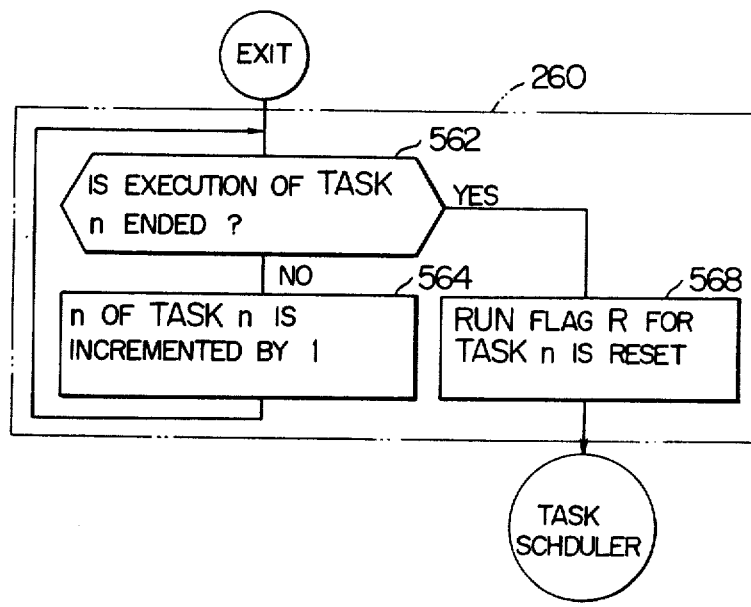
Figure 14:
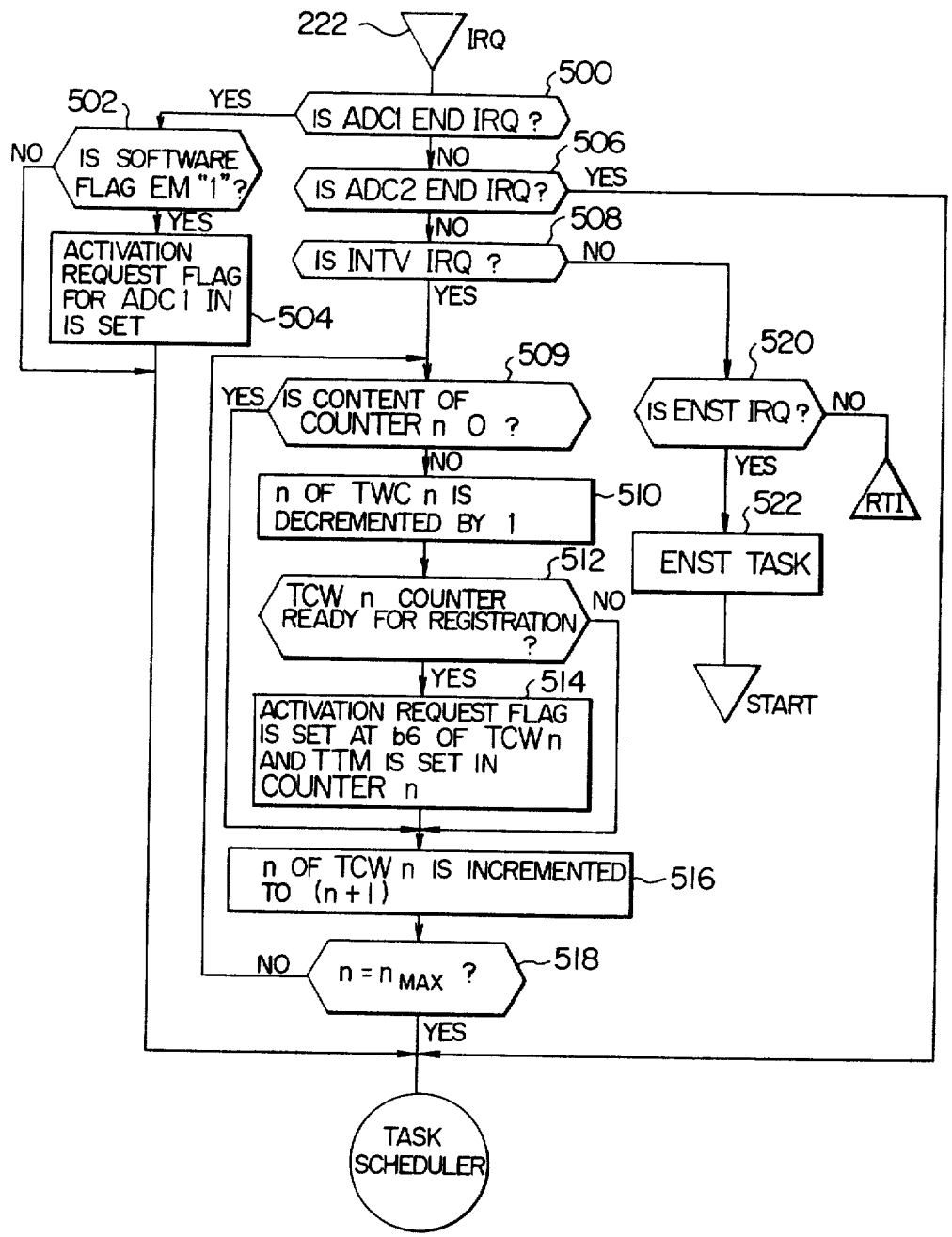
Figure 15:
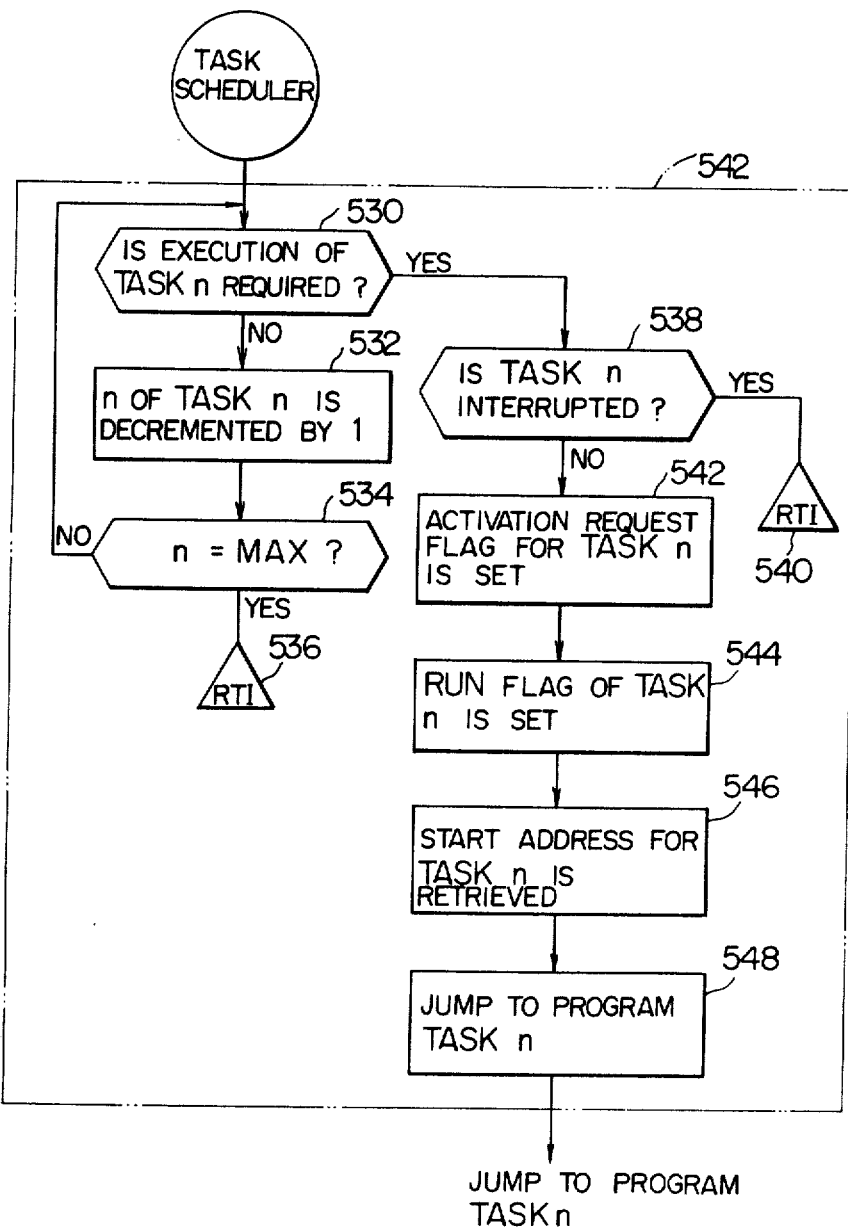
Figure 16:
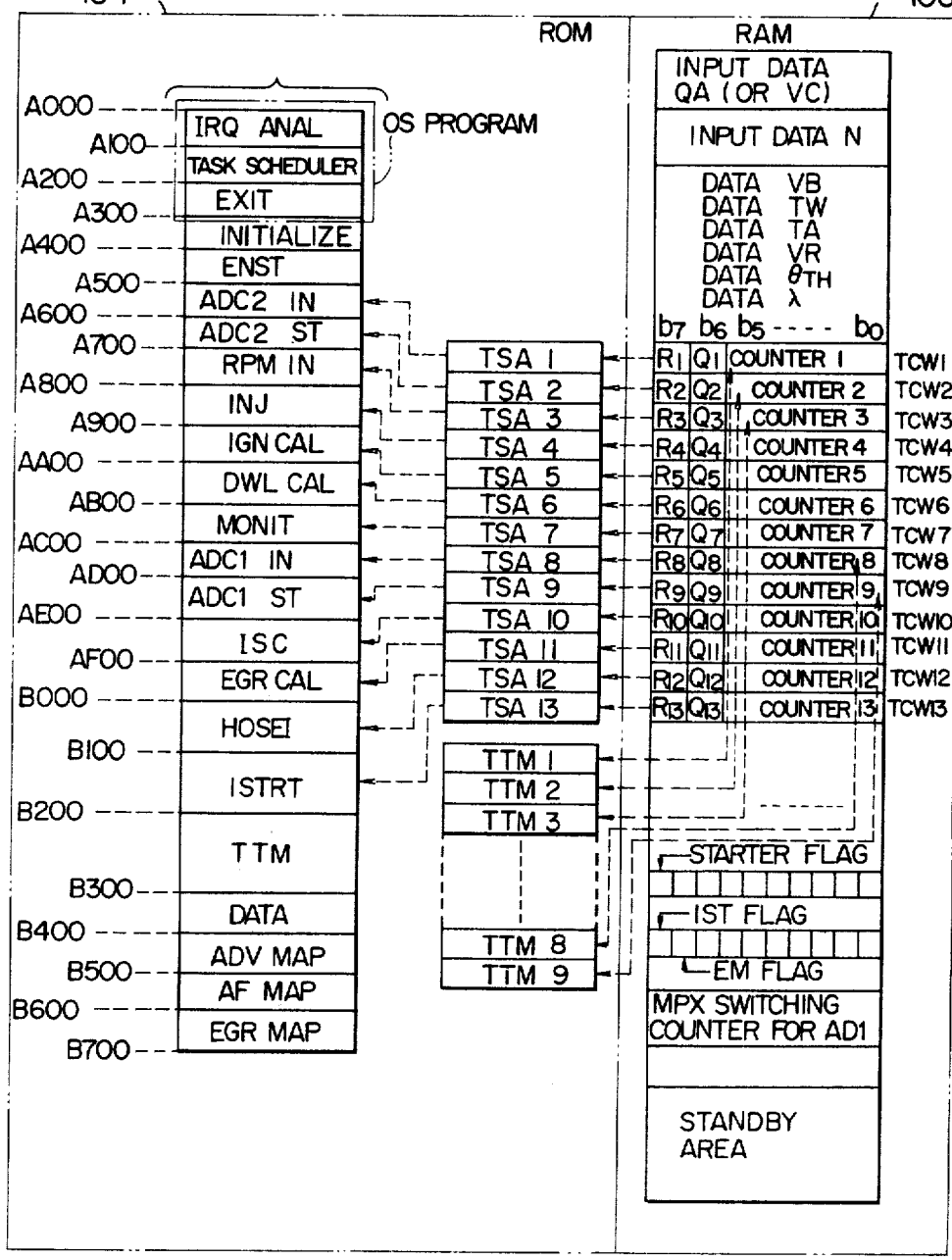
Figure 18:
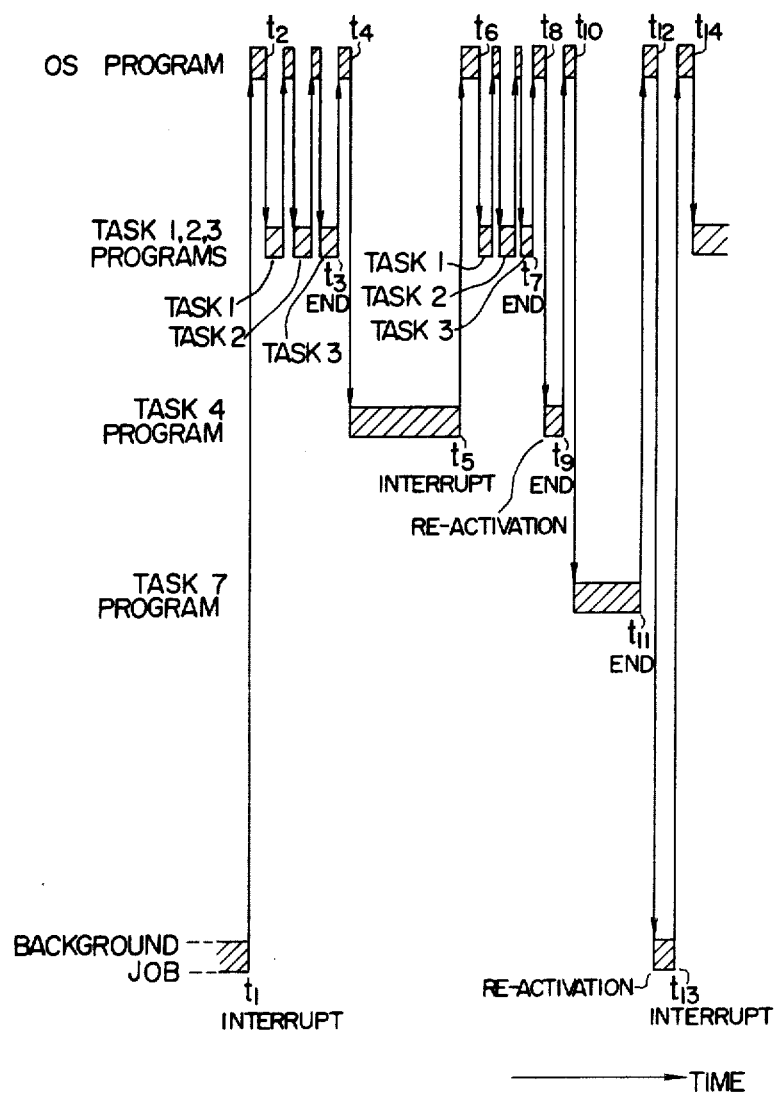
Figure 19:
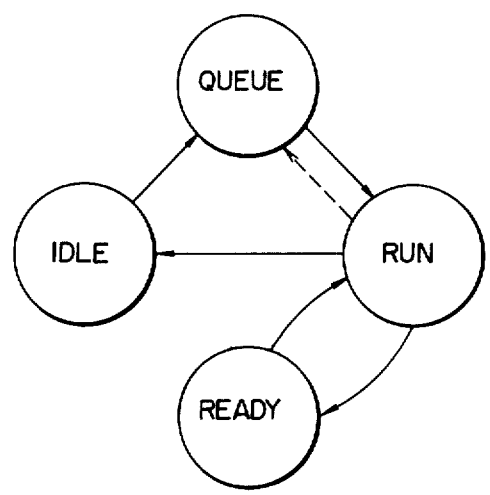
Figure 20:
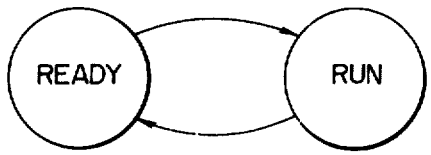
Figure 21:
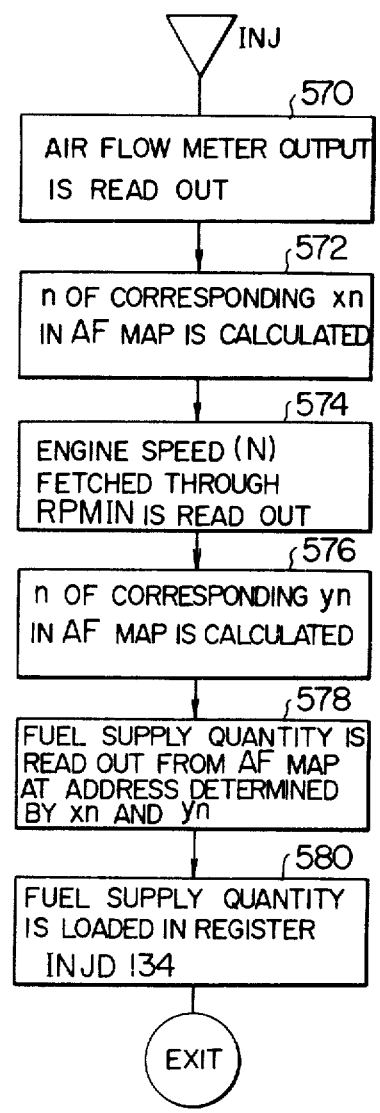
Figure 24:
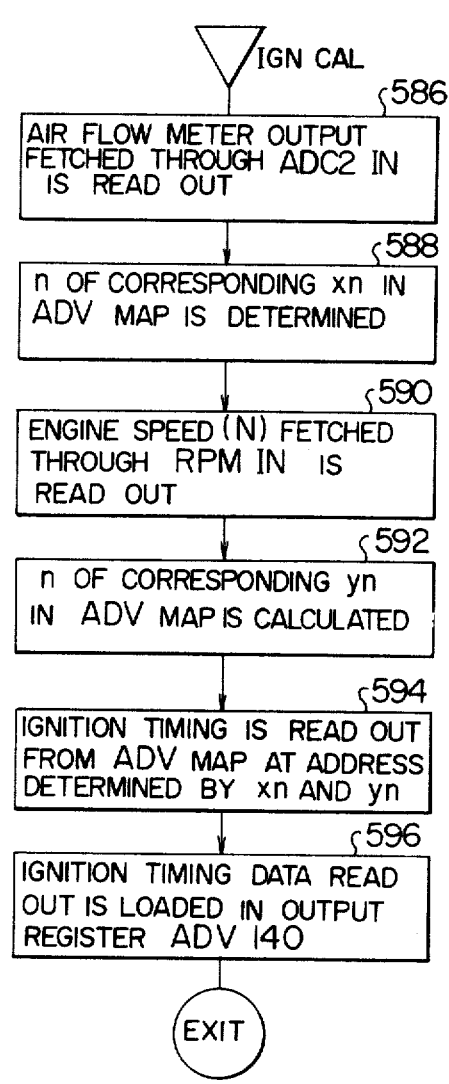
Figure 25:
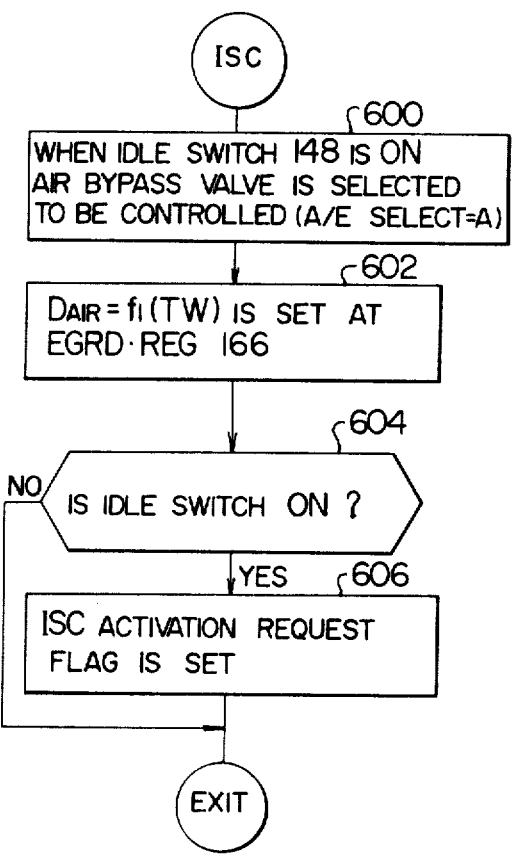
Figure 26:
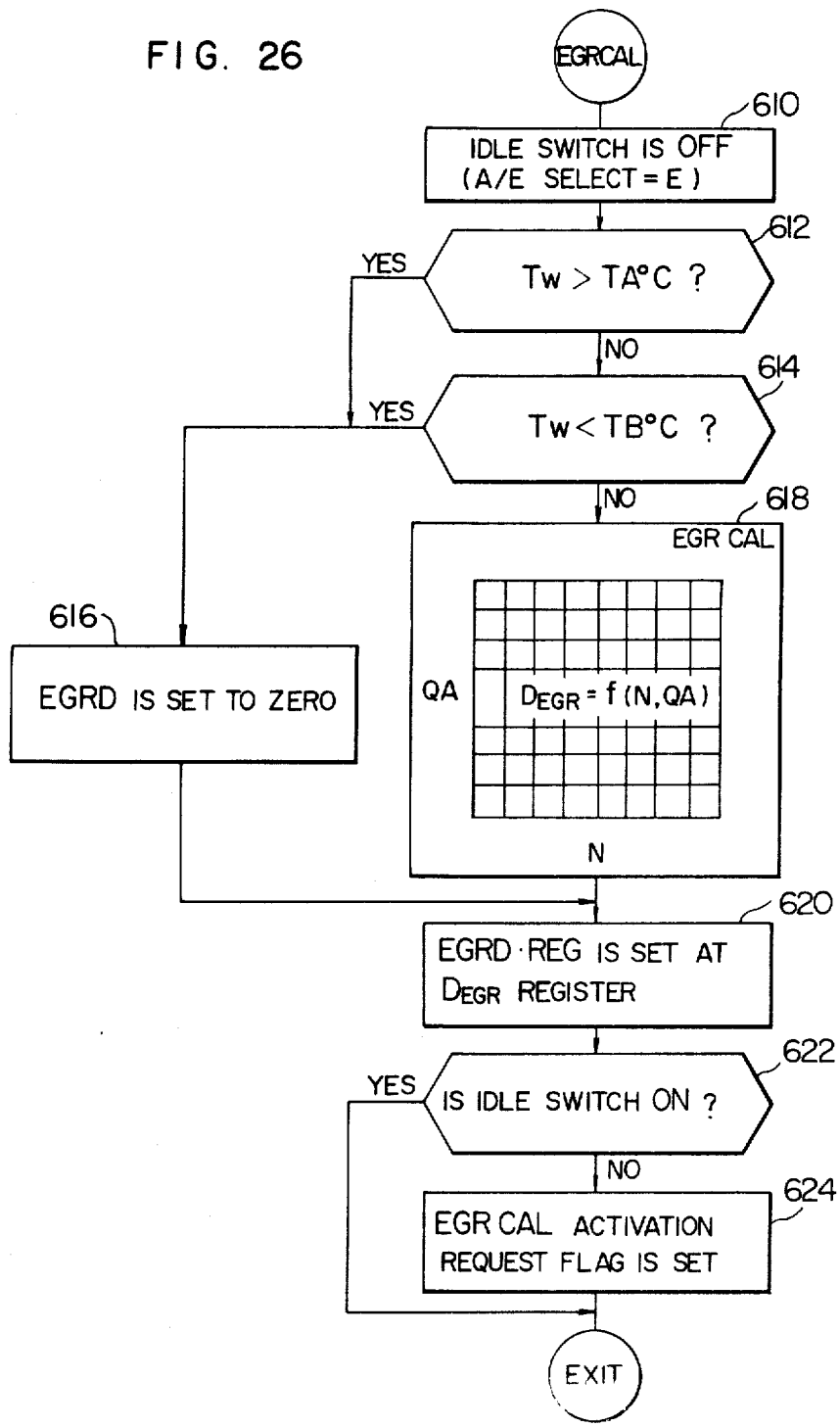
Figure 27:
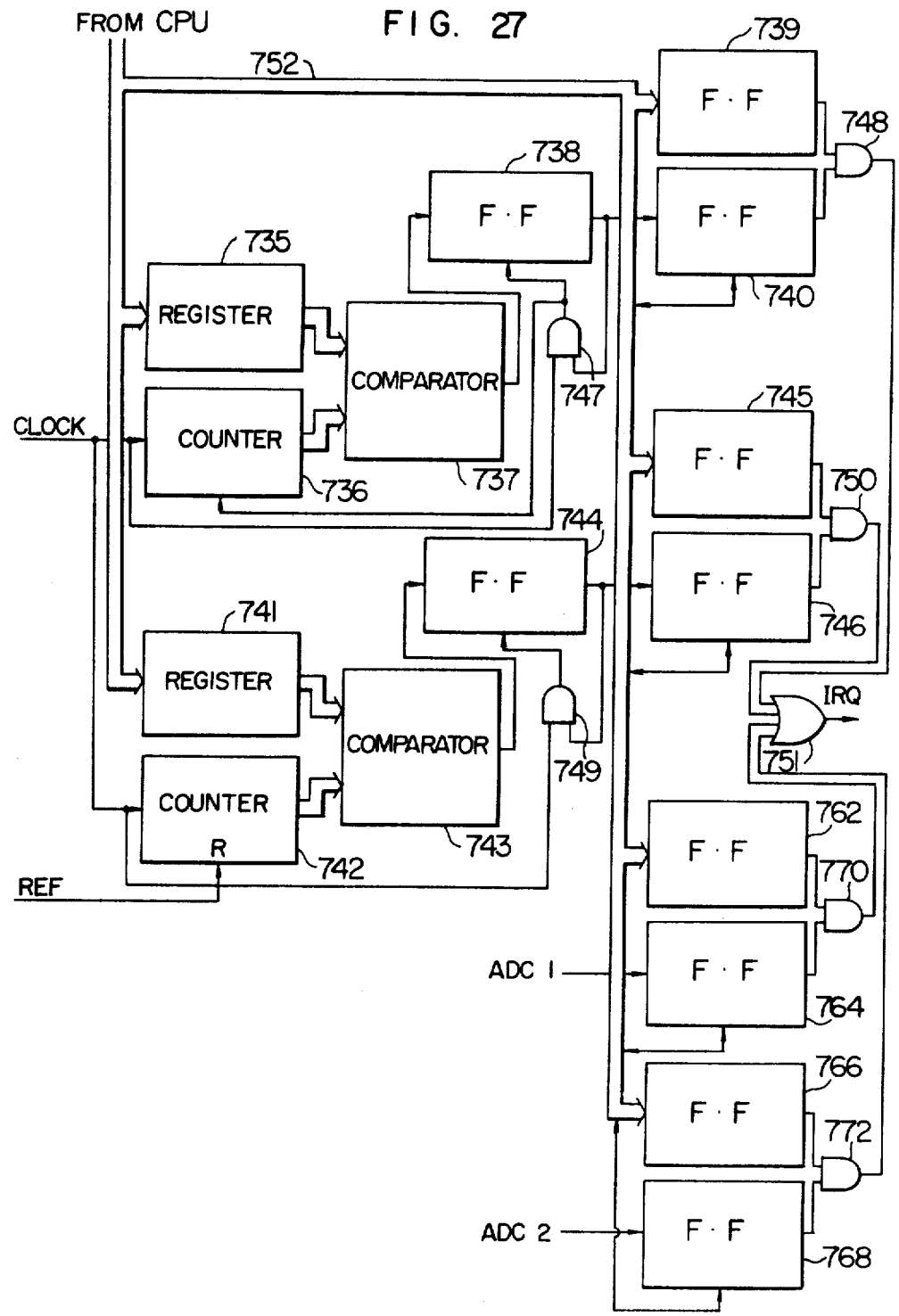
Figure 28:
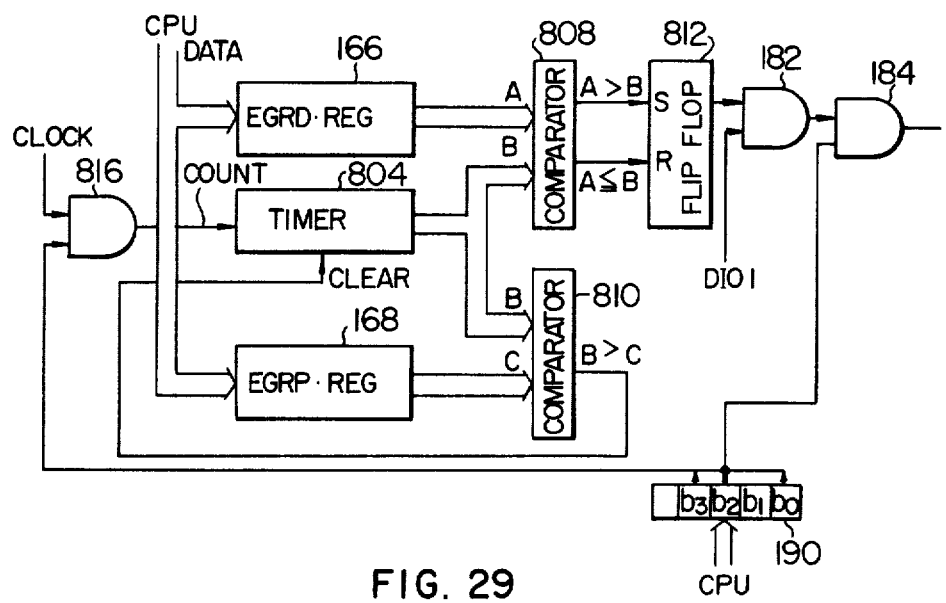
Figure 29:
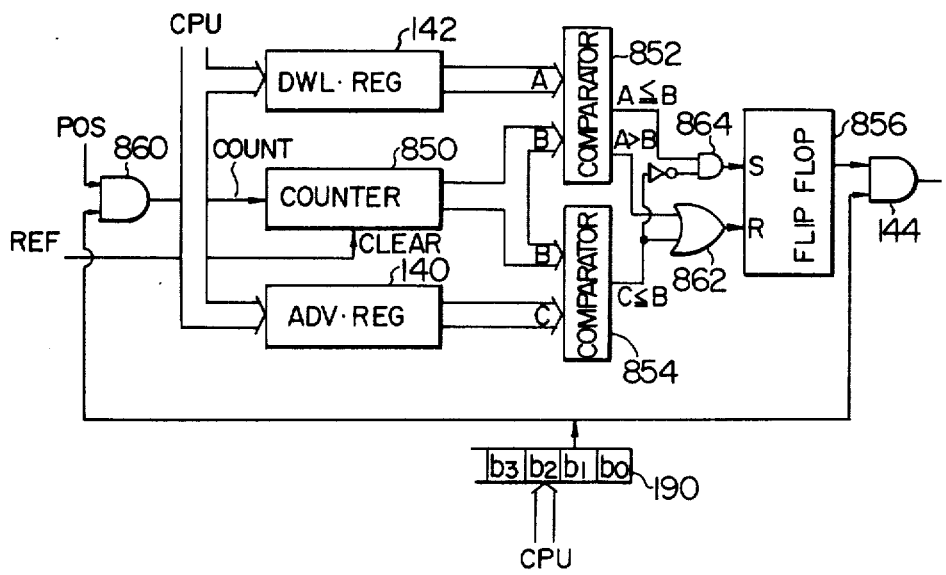
Figure 31:
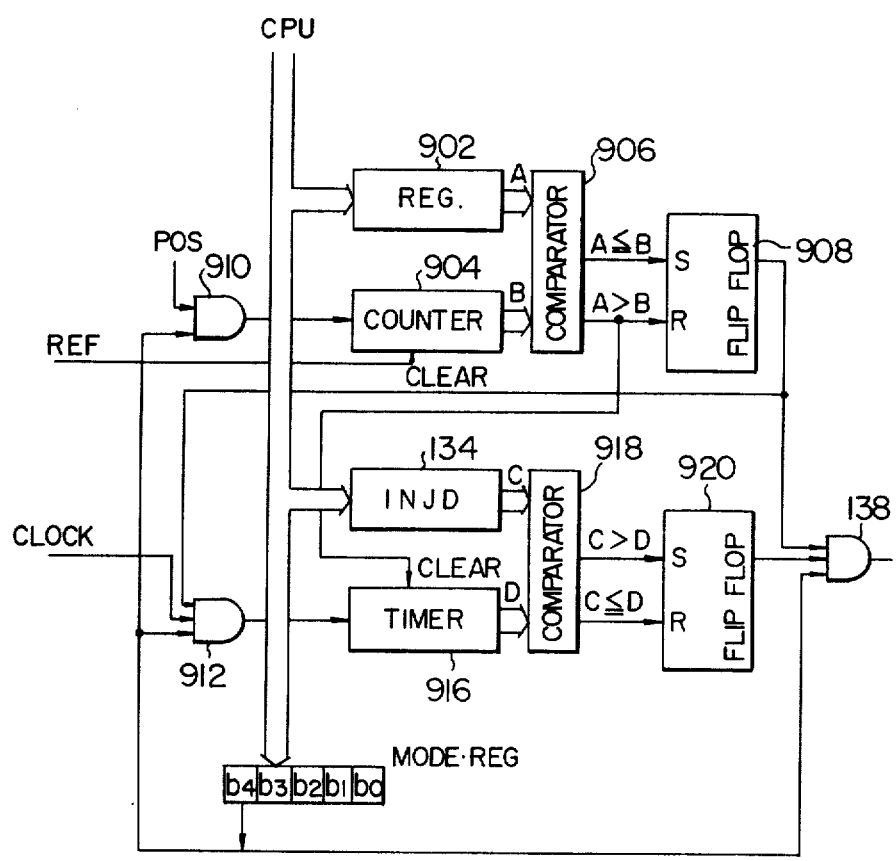

FIG. 10 graphically shows an ignition timing characteristic in a starting operation of the engine;

FIG. 11 graphically illustrates an air supply characteristic in the engine starting operation;

FIG. 12 graphically illustrates a fuel injection duration characteristic in the engine starting operation;

FIG. 13 shows details of a program MONIT;

FIG. 14 is a flow chart to illustrate details of the program denoted by numeral 224 in FIG. 5;

FIG. 15 is a flow chart to illustrate, in detail, the operations of a task scheduler;

FIG. 16 is a view to illustrate the operation for generating activation requests for task programs;

FIG. 17 is a flow chart to illustrate in detail a program EXIT;

FIG. 18 is to illustrate a sequence in which various programs are executed;

FIG. 19 is a view to illustrate changes in the state of a task program;

FIG. 20 is a view to illustrate changes in the state of a background job program;

FIG. 21 is a flow chart to illustrate details of a program INJ;

FIG. 22 shows details of ADV MAP and AF MAP in ROM shown in FIG. 16;

FIG. 23 is a schematic view of the AF MAP;

FIG. 24 is a flow chart to illustrate details of a program IGN CAL;

FIG. 25 is a flow chart to illustrate details of a program ISC;

FIG. 26 is a flow chart to illustrate details of a program EGR CAL;

FIG. 27 is a block diagram to show a circuit arrangement for generating IRQ's;

FIG. 28 is a block diagram to illustrate circuits associated with the EGRC register shown in FIG. 4;

FIG. 29 is a block diagram showing a circuit associated with the IGNC register 139 shown in FIG. 4;

FIG. 30 is a circuit diagram showing in detail the circuit associated with a discrete input/output circuit DIO 174 shown in FIG. 4;

FIG. 31 is a circuit diagram showing in detail a circuit associated with an INJC register shown in FIG. 4; and FIG. 32 is a signal waveform diagram to illustrate the operation of the circuit shown in FIG. 31.

Figure 1:
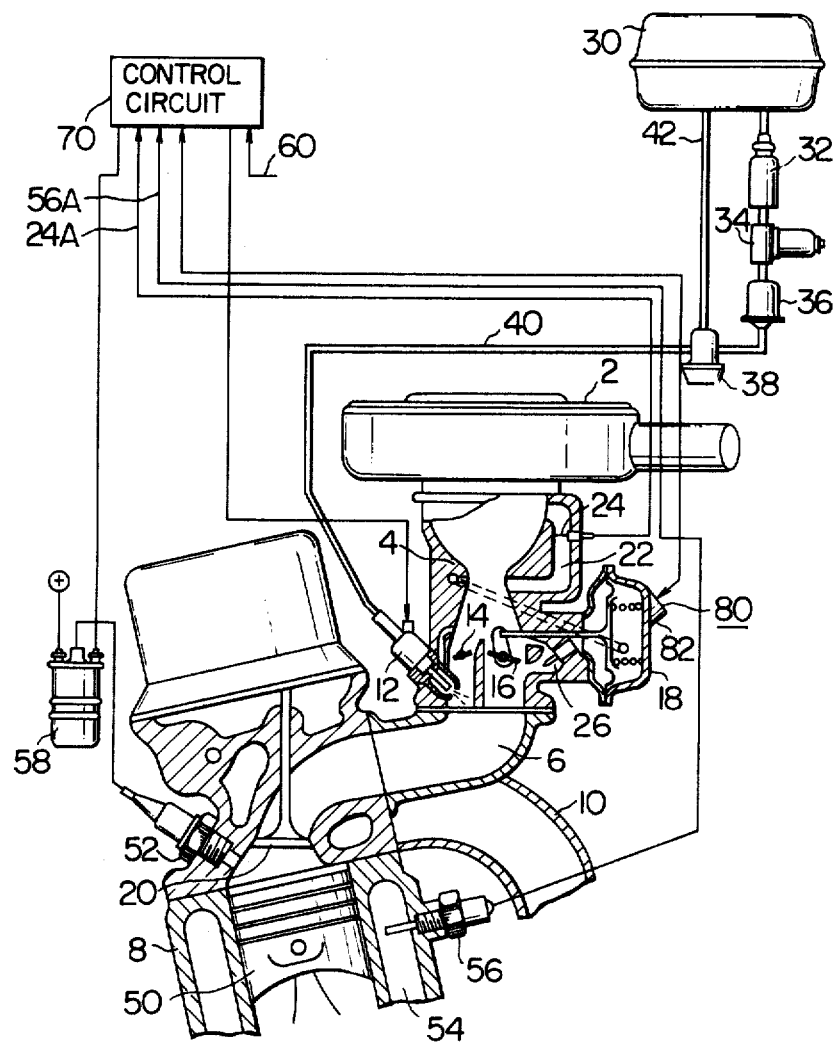
FIG. 1 shows, in a partial sectional view, an arrangement of an electronic type fuel injection apparatus of an internal combustion engine to which an exemplary embodiment of the invention is applied.

Now, the invention will be described in detail in conjunction with an exemplary embodiment thereof by referring to the drawings. Referring to FIG. 1, which shows a partially sectional view of a fuel injection system for an internal combustion engine, together with an electronic control system, air is supplied to cylinders 8 (only one of which is shown in FIG. 1) from an air cleaner 2 through a throttle chamber 4 and an intake conduit or manifold 6. Combustion product gas is discharged to the atmosphere from the cylinder 8 through an exhaust conduit 10.

Disposed in the throttle chamber 4 is an injector 12 for injecting fuel which is atomized in an air flow passage within the throttle chamber 4 to thereby form a fuel-air mixture which in turn is fed to a combustion chamber defined in the cylinder 8 through the intake manifold 6 and an air suction value 20.

Throttle valves 14 and 16 are disposed in the vicinity of the outlet of the injector 12 at the upstream side thereof. The throttle valve 14 is mechanically interlocked with the accelerator pedal so as to be operated by the driver. On the other hand, the throttle valve 16 is adapted to be actuated by a diaphragm device 18 such that the throttle valve 16 is fully closed in a small range of air flow and opened progressively as the negative pressure applied to the diaphragm device 18 is an increase due to increasing in the air flow quantity, to thereby prevent air flow resistance from being increased.

An air passage 22 is provided upstream of the throttle valves 14 and 16 in the throttle chamber 4. An electric heater element or hot wire 24 constituting a thermal type air flow meter is disposed in the air passage 22. The thermal type air flow meter is adapted to produce an electric signal which is varied in dependence on the speed of air flowing through the passage 22 and the thermal conductivity of the heater element or hot wire 24. Because it is disposed within the air passage 22, the hot wire or heater element 24 is protected from the adverse influence of a high temperature gas produced upon the occurrence of a backfire from the cylinder 8, as well as contamination due to dust contained in the intake air. The outlet of the air passage 22 is opened in the narrowest portion of a Venturi, while the inlet of the air passage 22 is opened at the upstream side of the Venturi.

Fuel is supplied to the injector 12 from a fuel tank 30 through a fuel pump 32, a fuel damper 34, a filter 36 and a fuel pressure regulator 38 which is adapted to feed fuel to the injector 12 through a pipe 40 under a pressure controlled so that difference between the pressure in the intake manifold 6 into which the fuel is injected and the pressure of fuel fed to the injector 12 remains at a predetermined constant level. A return pipe 42 is connected between the fuel pressure regulator 38 and the fuel tank 30, whereby excess fuel is fed back to the fuel tank 30 from the pressure regulator 38.

The fuel-air mixture charged into the combustion chamber of the cylinder 8 through the suction valve 20 is compressed by a piston 50 and then undergoes combustion ignited by a spark produced by a spark plug 52. Combustion energy thus produced is converted into mechanical energy through movement of the piston 50. The cylinder 8 is cooled by coolant water 54, the temperature of which is measured by a water temperature sensor 56. The measured value derived from the output of the sensor 56 is utilized as a parameter representing the temperature of the engine. A high voltage is applied to the spark plug 52 from an ignition coil 58 in a proper ignition timing.

A crank angle sensor (not shown) is provided in connection with a crank shaft (not shown) of the engine and is adapted to produce a reference angle signal for every reference crank angle (e.g. 180°) and a position signal for every predetermined angle (e.g. 1°) during rotation of the engine crankshaft.

Output signal 60 from the crank angle sensor, output signal 56A from the water temperature sensor 56 and the electric signal 24A produced from the thermal type air flow meter composed of a hot wire 24 are supplied to a control circuit 70 at inputs thereof. The control circuit 70 may be constituted by a microcomputer or the like and is adapted to process the input signals described above to thereby produce output signals for operating the injector 12 and the ignition coil 58.

In the engine system provided with the control arrangement described above, a bypass passage 26 is formed in the throttle chamber 4 across the throttle valve 16 to be communicated to the intake conduit 6 downstream of the throttle valve 16. A bypass valve 80 is provided in the air bypass passage 26 and is adapted to selectively open and close the bypass passage 26 in accordance with control signals applied thereto. To this end, a drive unit for the valve 80 is supplied with a control signal from the control circuit 70.

Figure 2:
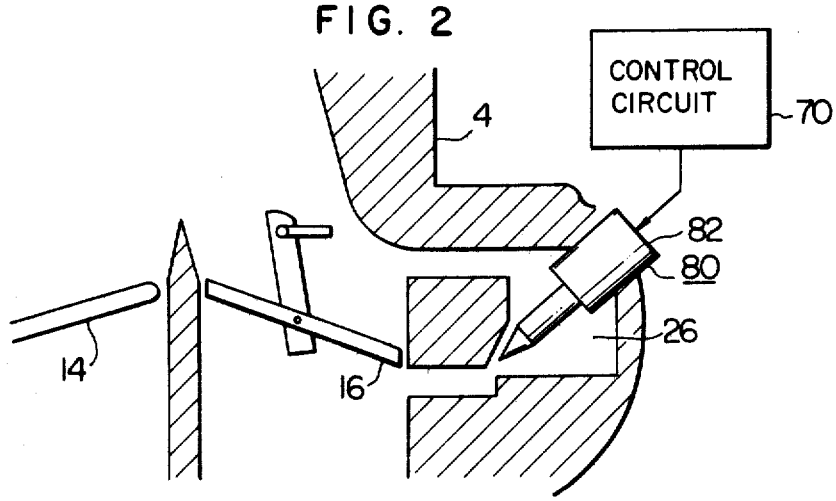
FIG. 2 is an enlarged fragmental view of FIG. 1 to show in detail the structure of an air bypass passage.

The arrangement of the air bypass passage 26 and the bypass valve 80 is shown more clearly in FIG. 2. It can be seen that the bypass passage 26 extending across the throttle valve 16 is closed or opened by the bypass valve 80 driven by the drive unit 82. In this connection, it should be noted that the air flow section of the bypass passage 26 is varied by the lift or stroke of the valve element of the bypass valve 80, which stroke is controlled by the drive unit 82 in dependence on the control input signal supplied from the control circuit 70. In other words, an ON/OFF signal for controlling an armature coil for driving the valve is periodically generated in the control circuit 70, while the armature coil controls the stroke or lift of the air bypass valve 80 in dependence on the ON/OFF signal.

Next, description will be made of the operation of the internal combustion engine of the fuel injection type described above.

Figure 3:
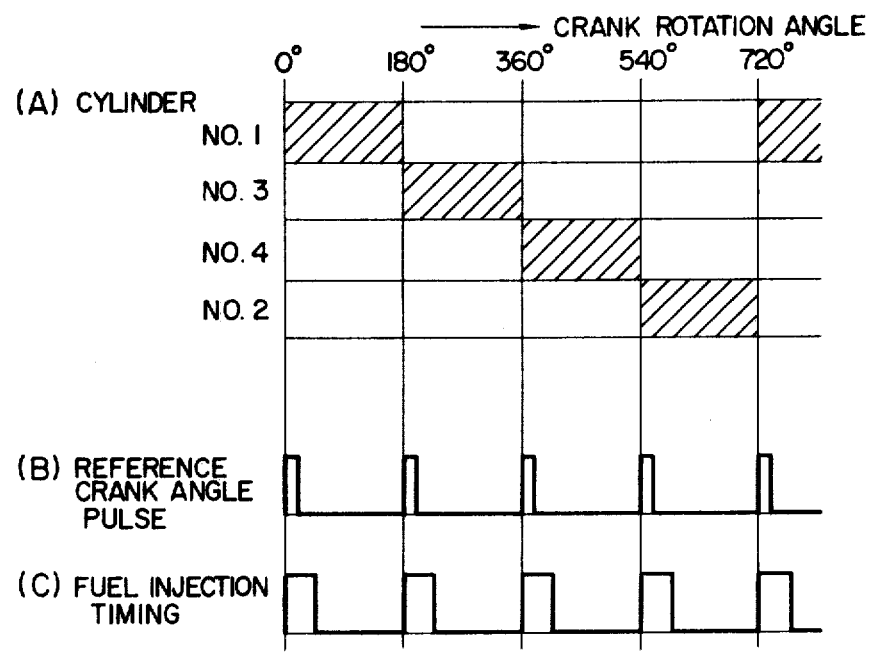
FIG. 3 illustrates the timing at which fuel is injected from an injector in a four-cylinder internal combustion engine.

Referring to FIG. 3, the fuel injection timing for the operation of the fuel injector is shown at (A) on the assumption that the engine is of a four-cylinder type. The rotation angle of the crank shaft is represented by the abscissa. Suction strokes of the individual cylinders are indicated by hatched areas. As can be seen from this figure, the suction strokes of the four-cylinder engine are present for every 180° of rotation the crank shaft, wherein the suction stroke for the first cylinder (No. 1) takes place in the range of the crank angle from 0° to 180°, the suction stroke for the third cylinder (No. 3) takes places between 180° and 360°, the suction stroke for the fourth cylinder (No. 4) takes place between 360° and 540°, and the suction stroke for the second cylinder (No. 2) is carried out in a range of the crank angle from 540° to 720°.

As is shown in FIG. 3 at (B), the reference crank angle pulse is generated for every 180° of the crank angle and utilized for opening the injector 12, the opening or injecting duration of which is arithmetically determined by the control circuit 70 on the basis of the data available from the various measurements described hereinbefore. The injecting duration of the injector 12 is illustrated in FIG. 3 at (C).

FIG. 4 shows in a schematic diagram a general arrangement of the overall control system. The control system includes a central processing unit (hereinafter referred to as CPU) 102, a read-only memory (hereinafter referred to as ROM) 104, a random access memory (hereinafter referred to as RAM) 106, and an input/output interface circuit 108. The CPU 102 performs arithmetic operations on the basis of input data from the input/output circuit 108 in accordance with various programs stored in ROM 104 and feeds the results of the arithmetic operations back to the input/output circuit 108. Temporary data storage as required for executing the arithmetic operations is accomplished by using the RAM 106. Various data transfers or exchanges among the CPU 102, ROM 104, RAM 106 and the input/output circuit 108 are realized through a bus 110 composed of a data bus, a control bus and an address bus.

The input/output interface circuit 108 includes input means constituted by a first analog-to-digital converter 119 (hereinafter referred to as ADC1), a second analog-to-digital converter 127 (hereinafter referred to as ADC2), an angle signal processing circuit 126, and a discrete input/output circuit 174 (hereinafter referred to as DIO) for inputting or outputting single-bit information.

The ADC1 includes a multiplexer 120 (hereinafter referred to as MPX) which has input terminals applied with output signals from a battery voltage detecting sensor 132 (hereinafter referred to as VBS), a sensor 56 for detecting the temperature of cooling water (hereinafter referred to as TWS), an ambient temperature sensor 112 (hereinafter referred to as TAS), a regulated-voltage generator 114 (hereinafter referred to as VRS), a sensor 116 for detecting a throttle angle (hereinafter referred to as θTHS) and a λ-sensor 118 (hereinafter referred to as λS). The multiplexer or MPX 120 selects one of the input signals and supplies it to an analog-to-digital converter circuit 122 (hereinafter referred to as ADC). A digital signal output from the ADC 122 is held by a register 124 (hereinafter referred to as REG).

The output from an air flow sensor 24 (hereinafter referred to as AFS) is supplied to the input of an ADC2 127 and converted into a corresponding digital signal through an analog-to-digital converter circuit 128 (hereinafter referred to as ADC). The digital output from the ADC 128 is loaded in a register 130 (hereinafter referred to as REG).

An angle sensor 149 (hereinafter termed ANGL) is adapted to produce a signal representative of a standard or reference crank angle, e.g. of 180° (this signal will be hereinafter termed REF signal) and a position signal representative of a minute crank angle (e.g. 1°) which signal will be hereinafter referred to as POS signal. Both of the signals REF and POS are applied to the angular signal processing circuit 126 to be shaped.

The discrete input/output circuit or DIO 174 has inputs D107–D105 connected to an idle switch 148 (hereinafter referred to as IDLE-SW), a top-gear switch 150 (hereinafter termed TOP-SW) and a starter switch 152 (hereinafter referred to as START-SW), respectively.

Next, the operations of the pulse output circuits and the objects to be controlled will be described in conjunction with arithmetic operations executed by CPU 102. A fuel-air ratio control device 132 (hereinafter referred to as INJC) serves for varying the duty cycle of the pulse signal applied to the injector 12 to thereby control the fuel injection quantity in the case of the embodiment being described. When the duty cycle of the pulse signal produced from the INJC 132 increases, the fuel supply quantity is correspondingly increased. The INJC 132 includes a register 134 (hereinafter referred to as INJD) for storing data representing the duty cycle described above. Thus, fuel is injected by the injector 12 during the period of the duty set in the register 134 in response to the REF pulse. There data is supplied from the CPU 102.

In this manner, a pulse having a pulse width corresponding to the fuel quantity to be injected is prepared by the INJC 132 and applied to the injector 12 through an AND gate 138. An ignition pulse generator circuit 139 (hereinafter referred to as IGNC) is provided with a register 140 (hereinafter referred to as ADV) for storing therein ignition timing data and a register 142 (hereinafter referred to as DWL) for controlling the duration of the primary current flowing through the ignition coil. Data for these controls are available from the CPU 102. The output pulse from the IGNC 139 is applied to the ignition system 154 through an AND gate 144.

A pulse generator circuit 164 (hereinafter referred to as EGRC) for producing a pulse signal to control the quantity of exhaust gas to be recirculated (EGR) includes a register 168 (hereinafter termed EGRP) for storing the pulse repetition period and a register 166 (hereinafter termed EGRD) for storing the duty cycle of the pulse signal which is supplied to the air solenoid valve 82 through AND gates 170 and 172. AND gate 170 has its other input supplied with the output signal DI01 from the DIO 174. More specifically, when the signal DI01 is at a level "L", the AND gate 170 is enabled to couple through the AND gate 172 the control pulse signal for controlling the air solenoid valve 82.

On the other hand, when the signal DI01 is at a level "H", an AND gate 182 is enabled, so as to control, through an AND gate 184, the EGR system 188.

The DIO 174 is an input/output circuit for a single bit signal as described hereinbefore and includes a register 176 (hereinafter referred to as DDR) for storing data to determine the output or input operation, and a register 178 (hereinafter referred to as DOUT) for storing data to be output. The DIO 174 produces an output signal DIOO for controlling the fuel pump 32.

A register 190 (hereinafter referred to as MOD) serves to store therein commands for designating various internal states within the input/output circuit 108. For example, all of the AND gates 138, 144, 172 and 184 can be enabled or disabled by a command set at the register MOD 190. In other words, the outputs from the INJC, IGNC, EGRC etc. can be selectively initiated and inhibited by setting corresponding commands at the MOD register 190.

FIG. 5 illustrates a program system for the control circuit shown in FIG. 4. When a power supply source is turned on by a key switch (not shown), the CPU 102 is set in the start mode (step 202) to execute an initialization program (INITIALIZE) 204. By this execution, at first, ADC1 119 is initiated for converting predetermined analog data of those applied thereto into corresponding digital values which data is fetched upon occurrence of the ADC1 END interrupt indicating the completion of A-D conversion. In a similar manner, operations for fetching or sampling other input analog data in terms of the corresponding digital values are successively repeated. Subsequently, the state of a starter motor switch is observed by an ISTRT program and an activation request of ADC1IN is set. These operations are successively repeated.

When the starter switch is turned on and the starter motor is energized, the MONIT program for calculating the fuel supply quantity and the ignition timing is activated, while inhibition or the inhibiting mask of the interval interrupt request is removed. Thereafter, until the next activation request is issued, the CPU executes background jobs (BACKGROUND JOB). The background jobs include, for example, a task for calculating the quantity of EGR (hereinafter referred to as EGR CAL. TASK) and a task for calculating the air bypass quantity (hereinafter referred to as ISC TASK). When an interrupt request (hereinafter termed IRQ) occurs during the execution of this task, an IRQ analyzing program 224 (hereinafter termed IRQ ANAL) is executed from the start step 222. The program IRQ ANAL is constituted by an end interrupt processing program 226 for the ADC1 (hereinafter referred to as ADC1 END IRQ), an end interrupt processing program 228 for the ADC2 (hereinafter referred to as ADC2 END IRQ), an interval interrupt processing program 230 (hereinafter referred to as INTV IRQ) and an engine stop interrupt processing program 232 (hereinafter referred to as ENST IRQ), and issues an activation request (hereinafter referred to as QUEUE) to the tasks to be activated among those described below.

The tasks to which the request QUEUE is issued from the program IRQ ANAL 224 are task 1 to task 13 denoted by 246 to 258 in FIG. 5. The numbers attached to these tasks represent the significance or effect or priorities allotted to them in accordance to which the tasks are to be executed. The task to which the request QUEUE from the ENST IRQ program 232 is issued is a task 262 for processing the stopping of the engine (this task will be hereinafter referred to as ENST TASK). When the task ENST TASK 262 has been executed, the control program is set back to the start mode and the start step 202 is reinitiated.

A task scheduler 242 serves to determine the sequence according to which the tasks are executed so that the task to which the request QUEUE is issued or execution of which is interrupted are executed starting from the task of the highest priority. Upon completion of the execution of the task, a termination indicating program 260 (hereinafter referred to as EXIT) is executed to inform this fact to the task scheduler 242. Subsequently, the task of the next highest priority among those in queue is executed and so forth.

When there remains no task the execution of which has been interrupted or to which the request QUEUE is issued, the execution of the background job is resumed under the command of the task scheduler 242. Further, when IRQ is issued during execution of a given task among those 1 to 13, the starting step 222 of the IRQ processing program is resumed.

The identities and functions of the individual tasks are listed in Table 1. In this Table, the numbers 1 to 13 represent the significance or priorities allotted to the individual tasks. The tasks are executed in the sequence of the numbers 1 to 13.

TABLE 1

| Task No. | Identification of programs | Functions | Activation (Timing) |
|---|---|---|---|
| — | IRQ ANAL | Analysis of IRQ and issue of requests for initiating tasks | IRQ |
| — | TASK SCHEDULER | Determination of tasks to be executed | End of IRQ ANAL or end of EXIT |
| — | EXIT | Indication of ended executions of task, Resetting R flag of TCW of ended task | End of individual task |
| — | ENST TASK | Stop of fuel pump and output of IGN starting INTLIZE | ENST IRQ |
| — | INTLIZE | Setting intial values at input/output circuit and RAM | START or RE-START (End of ENST) |
| 1 | ADC2IN | Fetching of output from ADC2 | INTV IRQ (10 m · sec) or ADC2 END |
| 2 | ADC2ST | Initiation of ADC2 | INTV IRQ (10 m · sec) |
| 3 | RPMIN | Fetching of engine speed | INTV IRQ (10 m · sec) |

TABLE 1-continued

| Task No. | Identification of programs | Functions | Activation (Timing) |
|---|---|---|---|
| 4 | INJ | Calculation of duty cycle for controlling fuel-air ratio | INTV IRQ (20 m·sec) |
| 5 | IGNCAL | Calculation of ignition timing | INTV IRQ (20 m·sec) |
| 6 | DWLCAL | Calculation of current supply initiation timing for ignition coil | INTV IRQ (20 m·sec) |
| 7 | MONIT | Calculation of fuel quantity and ignition timing for engine start | INTV IRQ (40 m·sec) |
| 8 | ADC1IN | Fetching of output from ADC1 | INTV IRQ (50 m·sec) or ADC1 END |
| 9 | ADC1ST | Initiation of ADC1 | INTV IRQ (50 m·sec) |
| 10 | HOSEI | Calculation of corrections | Activated by ADC1IN |
| 11 | ISTRT | Calculation of initial fuel quantity and ignition timing | Activated by ADC1IN |
| 12 | ISC | Calculation of duty cycle for controlling air bypass quantity | BACKGROUND JOB |
| 13 | EGRCAL | Calculation of duty cycle for controlling EGR valve | BACKGROUND JOB |

As can be seen from the Table 1, there are provided programs such as IRQ ANAL, TASK SCHEDULER and EXIT for supervising or monitoring the control program shown in FIG. 5. These supervising programs (hereinafter referred to as OS) are stored in ROM 104 at addresses AOOO to A2FF as shown in FIG. 16.

Each of the programs ADC2IN, ADC2ST and RPMIN is activated upon every occurrence of INTV IRQ which is periodically generated at a time interval of 10 m·sec. The programs INJ, IGNCAL and DWLCAL are activated for every INTV IRQ which is generated at a time interval or period of 20 m·sec. The program MONIT is activated every INTV IRQ generated at a time interval or period of 40 m·sec. The programs ADC1IN and ADC1ST are activated every INTV IRQ generated at a time interval of 50 m·sec. The EGRCAL program and ISC program are for the background jobs. The values (hereinafter referred to as TTM) representing the periods or time intervals at which the individual programs are activated by a timer counter are stored in ROM 104 at addresses B200 to B2FF.

Other data as required are stored at addresses B300 to B3FF. Further, data ADV MAP, AF MAP and EGR MAP constituting maps for arithmetic operations are also stored at addresses B400 to B700.

Figure 6:
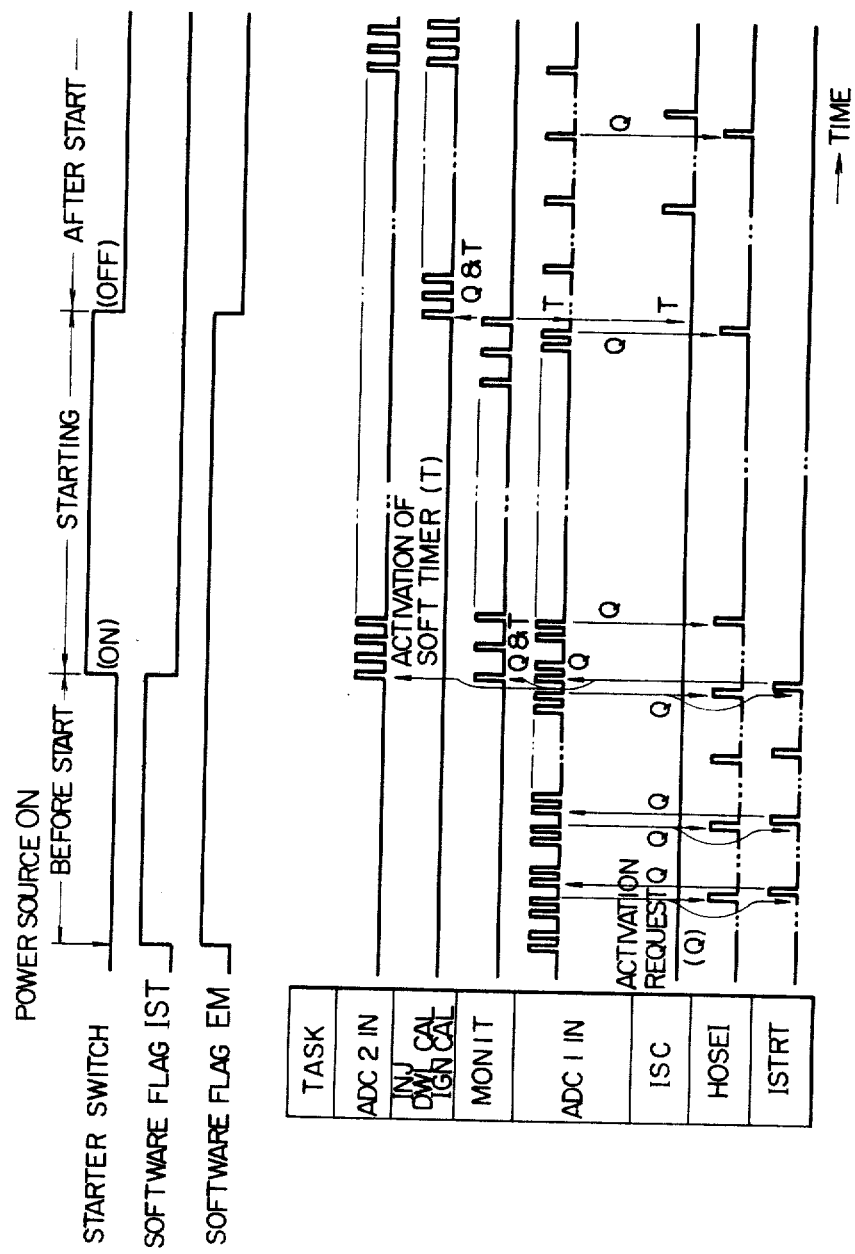
FIG. 6 illustrates a sequence for activating the tasks according to the invention.

Activations of the tasks of the control system shown in FIG. 5 for the engine starting operation are illustrated in a time chart of FIG. 6.

When the power supply source is turned on, software flags IST (initial start) FLAG and EM (engine stop mask) FLAG are set in RAM 106 shown in FIG. 16. More specifically, a binary bit "1" is set at the areas IST FLAG and EM FLAG of RAM 106 shown in FIG. 16. This is performed by starting and executing the program INITIALIZE 204 shown in FIG. 5. After execution of this program, the program ADC1IN is activated and the output from ADC1 is successively fetched. When all outputs of ADC1 are fetched, the programs HOSEI and ISTRT are activated by ADC1IN and executed. In a similar manner, the fetching of outputs from ADC1 and activations of the programs HOSEI and ISTRT are successively repeated.

When the starter switch is turned on, this fact is detected in the ISTRT task and then the flag IST is reset (i.e. the bit at the bit position for the software flag IST in RAM is reset to zero), while a soft timer for the programs ADC2IN and MONIT is activated by the program ISTRT with the inhibition of IRQ for these programs being removed, and the activation request is issued to the programs MONIT and ADC2IN. Thereafter, the programs ADC2IN, ADC2ST and MONIT are periodically activated at predetermined time intervals, respectively. The fuel quantity and the ignition timing at this point in time are arithmetically determined through the execution of the program MONIT. The program ADC1IN is executed at a predetermined time interval. When all the outputs from ADC1 have been fetched, the activation request is issued only to the program HOSEI. Now, the period during which the starter switch is turned on (i.e., the starter motor is driven) is referred to as the starting state.

When the starter switch is turned off, the engine is in the self-running state. At this point in time, the software flag EM is cleared, while the programs INJ, IGNCAL and DWLCAL are initiated by the program MONIT. These programs are subsequently activated periodically at predetermined respective time intervals. Simultaneously, the soft timer for the program MONIT is stopped, while all the other soft timers are activated. Consequently, subsequent activations of the tasks take place in response to the occurrence of the associated INTV IRQs.

The operations briefed above will now be described in detail by referring to the flow charts shown in FIGS. 7 to 9.

When the power supply source is turned on, the program INITIALIZE 204 illustrated in FIG. 7 is executed and the software flags EM and IST are set, as described above.

At a step 281, a standby area to which the contents of the CPU are transferred upon occurrence of IRQ is provided in RAM 106, as is shown in FIG. 16. At a step 282, the contents of RAM 106 are all cleared. At a step 283, the registers of the input/output interface circuit 108 are initialized (i.e. loaded with initial values). This initialization step includes setting of the initial value of the angle sensor 149, setting of DDR of DIO 174, the setting of the detection period for issuing of ENST IRQ, and the setting of the measuring time for detecting engine speed. At a step 284, the program ADC1 ST is triggered. At a step 285, for removing the inhibiting mask of ADC1 END IRQ, a level "H" is set at a flip-flop 276 in FIG. 27 constituting the mask register 200 shown in FIG. 4, as a result of which an ADC1 END interrupt request is thereafter allowed to be issued for executing the program ADC1IN. At a step 286, ADC2 END IRQ is inhibited by setting the inhibiting mask command for ADC2 END IRQ at the MASK register 200. Namely, a level "L" is set at a flip-flop 266 in FIG. 27 constituting the MASK register. At a step 287, software flags IST, EM are set in the RAM 106 shown in FIG. 16. When the step 287 is terminated, the program proceeds to the task scheduler to await the appearance of ADC2 END IRQ.

The program ADC1IN is illustrated in the flow chart shown in FIG. 8. When the program ADC1ST is activated at the step 284 shown in FIG. 7, a jump is made to the start address of the program AD1ST by the execution of TASK SCHEDULER 242. As a consequence, the output signal from the VBS (battery voltage detecting sensor) 132 which constitutes one of the inputs to MPX 120 of the ADC1 119 shown in FIG. 4 is selected and applied to the input of the ADC 122. At this time, the issuance of ADC1 END IRQ is awaited. When the digital value output from ADC 122 upon completion of the conversion operation thereof is loaded into REG 124, a signal representative of the termination of the operation of ADC1 119 is coupled to a flip-flop 764 (FIG. 27) constituting the status register STATUS 198, and ADC1 END IRQ is transferred to CPU 102. Consequently, an activation request is issued to the program ADC1IN through execution of the program ADC1 END 226 shown in FIG. 5. In other words, a level "H" is set at a bit position Q8 of RAM 106 in FIG. 16. The task scheduler will then detect the activation request to thereby activate the program ADC1IN shown in FIG. 8.

At a step 288, data is fetched from the register 124 and set in a data area DATA VB of RAM 106 in FIG. 16. At a step 289, the program ADC1ST is activated to select the sensor 56. At a step 290, it is ascertained whether all the output values from the sensors 132, 56, 112, 114, 116 and 118 have been fetched. Since only the fetching of the output signal from the sensor 132 has been completed in this case, the routine is returned to the EXIT step, whereby the program ADC1ST is again started. The MPX 120 thus selects the output from the water temperature sensor TWS 56 as the next input thereto. Upon completion of the analog-to-digital conversion of the output signal from the sensor 56, the program ADC1IN is executed in response to the issuance of ADC1 END IRQ, whereby the digital value representative of the output from the sensor TWS 56 stored in the register or REG 124 is read out and stored at DATA area DATA TW in RAM 106. Next, the program proceeds to the EXIT step and then the routine is returned to the ADC1ST program by the TASK SCHEDULER. In this manner, through execution of the programs ADC1ST and ADC1IN in a looped routine, the digital values representing the outputs from the sensors, respectively, are successively fetched. When all the data ADC1 have been fetched, the program proceeds to a step 291 at which a level "H" is set at each of bit positions Q12 and Q13 of RAM 106 in FIG. 16 for requesting the programs HOSEI and ISTRT to be activated, and then these programs are executed according to the program of the task scheduler.

FIG. 9 is a flow chart of the program INSTRT.

At a step 292, the ignition timing for starting the engine is arithmetically determined and set. To this end, the ignition timing $\theta ADV(ST)$ is arithmetically determined as a function of the temperature TW of engine cooling water. The relationship between the ignition timing for starting the engine and the cooling water temperature is graphically illustrated in FIG. 10. In accordance with the characteristic relationship illustrated in FIG. 10, the ignition timing $\theta ADV(ST)$ is arithmetically determined. The results as obtained are loaded in the register ADV 140 of IGNC 139 shown in FIG. 4.

Subsequently, the initial value for the fuel injection time is arithmetically determined. The arithmetic operation is executed in accordance with the relationship between the fuel injection time and the temperature of the engine cooling water such as shown in FIG. 12. The result of the arithmetic operation is placed in the register INJD 134.

Next, at a step 293, the program determines whether the starter switch is closed or not by monitoring the bit DIO 5 of the DIO 174 shown in FIG. 4.

When the starter switch is opened, activation request is issued to the program ADC1ST at a step 297. More specifically, a bit "1" is set at the sixth bit position b6 of the task control word TCW9 of RAM 106 shown in FIG. 16, whereby ADC1 is activated. Subsequently, the programs ADC1IN, HOSEI and INSTRT are executed. This routine is repeated until the starter switch is turned on.

In this manner, by virtue of the fact that execution of the programs described above is repeated for a number of times until the starter switch is turned on, data is fetched from ADC1 for the corresponding number of times and subjected to filtering, as a result of which the ignition timing, etc. can be arithmetically determined on the basis of the constantly updated data. In this manner, when the starter switch is turned on, the engine can be instantly started with a high reliability, since the engine starting operation is made on the basis of the optimum data values. Further, the engine starting performance is additionally improved by virtue of the fact that activation request Q is issued to the programs ADC1IN and MONIT in response to the closing of the starter switch, whereby the arithmetic operation for determining the ignition timing is effected on the updated data. On the other hand, assuming that only the timers for ADC1IN and MONIT are activated, the fetching of data and calculation would be delayed for the respective predetermined timer interval period in the worst case, to degrade the starting performance of the engine.

During the time interval between the turning-on of the power supply source and the closing of the starter switch, the computer can be utilized fully in a useful manner.

When the starter switch is turned on, an activation request is issued also to the program ADC1ST and MONIT at a step 294. Additionally, soft timers for the programs ADC2IN and MONIT are started. Thereafter, activation requests for the programs ADC2IN and MONIT are generated automatically at the activation timings stated in the Table 1.

As an additional preparation procedure for the engine starting operation, at a step 295, a bit of high level "H" or logic "1" is set at the zeroth bit position of the DOUT register 178 of DIO 174 for initiating the operation of the fuel pump 32. As a result, the zeroth bit output DIO 0 of DIO is at a high level, resulting in the fuel pump being electrically energized. Next, the first bit of the DOUT register 178 is set at low level "L". Then, the air bypass valve 82 is controlled by the output from the EGRC circuit 164. In practice, the setting of the zeroth bit and the first bit of the DOUT register 178 described above are effected simultaneously.

In order to initiate INJC 132, IGNC 139 and EGRC 164 provided at the output side of the input/output interface circuit 108, a bit of high level "H" is set at a mode register 190 described hereinafter, as a result of which the pulse outputs are supplied to the various control devices.

At a step 296, the software flag IST is reset. In other words, bit "0" is set at the IST flag area in RAM 106 shown in FIG. 16.

FIG. 13 shows a flow chart of the program MONIT. An activation request for this program is issued periodically at a time interval of 40 m·sec. By monitoring the bit DIO 5 of the DIO 174 at a step 302, the program determines whether the starter switch is opened. If the result is negative or "NO", a count is conducted as to how many times this step is repeated at a step 303. In other words, the program determines how many times (N) the program MONIT has been activated. At a step 304, the fuel quantity as well as the ignition timing and the current flow initiating time of the ignition coil are arithmetically determined. The arithmetic operation for determining the ignition timing is effected as a function of the temperature of engine cooling water, as is illustrated in FIG. 10. On the other hand, the time duration of the fuel injection is determined as a function of the temperature of engine cooling water in FIG. 12 and the value of N determined at the step 303. More specifically, the fuel injecting duration is calculated as a difference time obtained by subtracting KN (where K is a constant) from the fuel injection time which is determined on the basis of the cooling water temperature in FIG. 12. Consequently, the duration of the fuel injection becomes shorter as the energization of the starter motor takes a longer time, whereby combustion in the engine cylinders is much facilitated. In this connection, it is to be noted that the calculation is made on the assumption that N=0 during the period between the turn-on of the power supply source and the turn-on of the starter switch. Further, the current flow initiating time of the ignition coil is determined. Now, the fuel quantity and the current flow initiating time are greatly influenced by the variation of the battery voltage. The battery voltage decreases greatly in the starting period during which the starter motor is operated. In order to obtain optimum data of the fuel quantity etc. regardless of sudden changes of the battery voltage, the MONIT program is executed every 50 m·sec. Further, since ADC1IN is activated in response to ADC1 END IRQ, data of the sensors 132, 56, 112-118 may be sequentially fetched with a time interval of about 25 m·sec., so that those data fetched from ADC1 can sufficiently follow the sudden change of the battery voltage.

An activation request for MONIT program is issued by setting a level "H" or "1" at a bit position Q7 of RAM 106 every 50 m·sec. and then the MONIT program is executed in TASK SCHEDULER, as described hereinafter. At the start of the execution of MONIT program, the QUEUE flag set at the bit position Q7 is reset, and a RUN flag is set at a bit position R7. In other words, a level "L" or "0" and a level "H" or "1" are set at the bit positions Q7 and R7, respectively. When the execution of the MONIT program is terminated, a jump is made to the EXIT program. In the EXIT program, the RUN flag in the bit position R7 is reset to indicate the termination of the MONIT program. Thereafter, upon a lapse of 50 m·sec., the QUEUE flag is set again at the bit position Q7. In this manner, the MONIT program is executed every 50 m·sec. On the other hand, when the starter switch is turned off, a level "H" is set at each of bit positions Q4 and Q5 to activate the programs INJ, DWLCAL and IGNCAL and, at the same time, data of TTM 4 and TTM 5 are set in COUNTER 4 and COUNTER 5, respectively, to start the associated soft timers in FIG. 16. At that time, the content of the COUNTER 7 is made "0" to inhibit the soft timer for the program MONIT, while data of TTM 1 to TTM 9 except for TTM 7 are set in COUNTER 1 to COUNTER 8 except for COUNTER 7, respectively, to activate all the other soft timers. Additionally, a flip-flop 762 in FIG. 27 is reset to set a command for inhibiting ADC1 END IRQ at the MASK register 200.

Next, at a step 308, a level "H" or "1" is set in a flip-flop 745 in FIG. 27 to remove the inhibiting mask of ENST IRQ. Accordingly, after the step 308, the engine stop can be detected by the ENST IRQ now released.

At a step 309, the software flag EM is reset. In other words, the bit at the EM FLAG area of RAM shown in FIG. 16 is set to "0". Then, a termination or end indication is made by resetting the bit position R7 in the EXIT program. Now, the engine is in the self-running state controlled by the various programs activated by the associated timers.

As will be appreciated from the above description, the issuing of activation requests Q for the programs INJ, DWLCAL and IGNCAL in response to the turning-off of the starter switch allows the arithmetic operations for determining the fuel supply, ignition, etc. to be effected at once, whereby the engine is driven smoothly on the basis of the constantly updated data quantities. In contrast thereto, assuming that the activation request is issued only to the timers for the programs INJ, DWLCAL and IGNCAL in response to the turning-off of the starter switch, calculation of required control quantities will be delayed for the respective predetermined timing intervals or periods in the worst case, resulting in a non-smoothness in the driving state of the engine as well as a deterioration in the quality of exhaust gas.

According to the teaching of the invention, when an activation request is issued to a task program, the timer for activating that task is simultaneously started, to thereby assure a smooth engine control. Particularly, in the case of the embodiment being described, the software flags IST and EM are used for discriminating the states before, during and after the starting operation of the engine in the control for activating the various tasks.

Before the starting operation, only the task ISTRT for determining the fuel injection time or duration for the starting operation is processed together with the associated tasks ADC1IN and HOSEI. In this routine, when analog input information has been once processed for the task ADC1IN, then the activation request Q is issued from this task to the other tasks HOSEI and ISTRT. Accordingly, the tasks HOSEI and ISTRT are processed in this order, and an activation request is issued to the task ADC1IN at the end of the task ISTRT. In this way, the sequence of the tasks ADC1IN, HOSEI, ISTRT and again ADC1IN is executed in this order before the starting of the engine.

When the starter switch is turned on, the operation is in the engine starting mode, wherein the activation requests are issued from the task ISTRT to the other task programs ADC1IN, MONIT and ADC2IN. In this connection, it should be mentioned that the task ADC-1IN is activated by the activation request Q and the task ADC2IN is periodically activated at predetermined time intervals from the associated soft timer, while the task MONIT is activated either by the activation request Q or the soft timer T. Assuming that only the soft timer T is used, a delay corresponding to the predetermined timing interval will be involved in the worst case, making it impossible to attain an optimum fuel injection to a great disadvantage for the starting performance of the engine. The same applies to the activation of the task INJ after the engine has been started.

In this manner, by providing two types of activations, i.e. the activation request and the soft timer T for the task for the fuel injection, a smooth transition can be assured among the tasks, which has been found particularly advantageous in starting the engine in a low temperature state.

Now, referring to FIG. 5, processing operations due to the issue or generation of IRQ will be described. The program 224 for analyzing the causes of IRQ comprises subprograms for the processing of ADC1 END IRQ 226, the processing of ADC2 END IRQ 228, the processing of INTV IRQ 230 and the processing of ENST IRQ 232. For executing these subprograms 226, 228, 230 and 232, respectively, the contents of the associated IRQ as issued has to be at first examined. To this end, the contents in the STATUS register 198 shown in FIG. 4 are examined for determining why IRQ has been issued.

In accordance with the cause which gives rise to the generation of IRQ in concern, one of the subprograms 226, 228, 230 or 232 is executed, as a result of which the activation request QUEUE is issued to the TASK required to be executed among the tasks 1 to 9.

In this connection, it should be mentioned that when too many IRQ's are generated, a long period of time is required for executing the supervisory program (hereinafter referred to as the OS program), resulting in that the time available for arithmetic operations for engine control is eventually restricted. Accordingly, in the case of the embodiment being described, it is assumed that ADC1 END IRQ 226 is generated only during a time period from the turn-on of the power supply to the engine starting operation shown in FIG. 6, but is otherwise inhibited. More specifically, at the step 306 of the MONIT program shown in FIG. 13, an inhibit command for ADC1 END IRQ is set in the MASK register 200 shown in FIG. 4. ADC2 END IRQ 228 is originally inhibited. More specifically, at the step 286 of the program INITIALIZE shown in FIG. 7, the contents of the MASK register are so set that ADC2 END IRQ is inhibited. The ADC2 END IRQ remains inhibited by preventing the IRQ inhibition removal command from being issued.

An example of the program 224 is shown in FIG. 14. This program proceeds from the entry step 222 to a step 500 where the program determines whether IRQ being currently issued is ADC1 END IRQ. If negative or "NO", the program determines at a step 502 whether the software flag EM in RAM shown in FIG. 16 is "1" or not. When this flag is "0", this routine proceeds to the task scheduler. On the other hand, when the flag is "1", an activation request is issued to the program ADC1IN at a step 504. To this end, a flag "1" is set at the bit position b6 or Q8 of the task control word TCW8 in RAM 106 shown in FIG. 17. Thereafter, the task scheduler 242 is resumed. In the case of the exemplary embodiment, ADC1 END IRQ is generated only in the state before the engine start or in the course of starting the engine as shown in FIG. 6. Otherwise, ADC1 END IRQ is inhibited. When the decision at the step 500 is "NO", the program proceeds to a step 506 at which step the program determines whether the IRQ being currently issued is ADC2 END IRQ. If the result of the decision at the step 506 is "YES", the program proceeds to the task scheduler. Otherwise, the step 508 is executed, whereby ADC2 END IRQ is inhibited in all the engine states.

At a step 508, the program determines whether the IRQ being currently issued is INTV IRQ. If affirmative, the program proceeds to a step 509. Steps 509 to 518 are imparted with functions to determine the task program to be activated by the INTV IRQ among the tasks 1 to 9.

Now, if a level "L" or "0" is set initially in any of the COUNTERS 1 to 9 respectively corresponding to the tasks 1 to 9, an activation request Q is not set at the bit position b6 of the TCW whose counter has initial set value of "0" regardless of the presence of the INTV IRQ. Accordingly, the execution is not made for the task corresponding counter of which has an initial set value of "0".

Thus, if "0" is set in any of the COUNTERS 1 to 9, execution of the corresponding task is stopped. On the other hand, the stopping of the execution of the task is removed by setting data of corresponding TTM in the corresponding counter.

At first, the program determines whether the content of COUNTER 1 corresponding to the task 1 is "0" or not at a step 509. When the decision at the step 509 is "YES", it is assumed that the execution of the task 1 is inhibitted and the program proceeds to a step 516 without setting a flag "1" at a bit position Q1. At a step 516, retrieval of the activation timing for the program of the task 2 is effected in place of the task 1. If the result of the decision at the step 509 is "NO", the program proceeds to a step 510. At this step, the task control word for the task 1, i.e. a counter constituted by the bit positions b0 to b5 of TCW1 shown in FIG. 15 is decreased by 1. It should be mentioned that the activation timings for the TASKS 1 to 9 listed in the Table 1 are set, respectively, in the counters 1 to 9 corresponding to the counters 1 to 9 of TCW1 to TCW9 in RAM 106, respectively. Since INTV IRQ is assumed to be periodically generated at a time interval or period of 10 m·sec., the initial values set at the counters 1 to 9 are equal to 1, 1, 1, 2, 2, 2, 4, 5 and 5, respectively. At a step 512, the contents of the counter 1 of TCW1 are compared with those of the task activating timer TTM1 shown in FIG. 16. All the times TTM1 to 11 are loaded with "0", wherein the presence of "0" in TTM1 and the presence of "1" in the counter 1 mean that the program of task 1 (denoted by 246 in FIG. 5) is activated every 10 m·sec., since it is assumed that INTV IRQ is generated at a period of 10 m·sec. At the step 512, the contents of the counter shown in FIG. 16 and the task timer TTM1 are compared with each other. When coincidence is found, that is, the value of the counter becomes zero (i.e. "YES"), the program proceeds to a step 514 at which a flag "1" is set at b6 of the task control word TCW1, i.e. Q1. In the illustrated embodiment, the bits b6 of every TCW represent the flags for requesting the activation of the associated tasks. The data in TTM1 is set in the bit positions b0 to b5 of the COUNTER1 of TCW1 (i.e. the initial value "1" is set), because the flag "1" is set at b6 of TCW1, i.e. Q1, at the step 514.

At the step 516, retrieval of the activation timing for the program of task 2 is effected in place of the task 1. At a step 518, the program determines whether the task 9 has been completed, i.e. if n=10. Since n=2 in this case, the program returns to the step 509 at which step the program determines whether the content of COUNTER2 is "0". When the decision at the step 509 is to "NO", the program proceeds to the step 510, at which step the contents of the counter 2 of TCW2 in RAM 106 shown in FIG. 16, which is the task control word for the program of task 2, is decreased by "1". At the step 512, the decreased contents are compared with the contents of TTM2 of ROM 104 shown in FIG. 16. Since the initial value of COUNTER2 of TCW2 is "1", the contents of COUNTER2 becomes equal to "0" at the step 510. Consequently, the contents of COUNTER2 coincides with the contents of TTM2, whereby a flag "1" is set at the bit position b6 or Q2 of the task control word TCW2 at the step 514. Next, at the step 516, the task to be retrieved is updated to the task 3. In a similar manner, for the task 4, the contents of COUNTER4 of TCW4 in RAM shown in FIG. 16, which is the task control word for the program of the task 4, is decreased by 1 at the step 510. The contents of COUNTER4 are then compared with that of TTM4 of ROM 104 shown in FIG. 16 at the step 512. In this case, the initial value of COUNTER4 is equal to "2", which means that the activation timing for the task 4 is 20 m·sec. Accordingly, assuming now that the contents of COUNTER4 equal "1", then the decision at the step 512 leads to "NO", which means that the activation timing is not for the program of the task 4. Thus, the program proceeds to the step 516 at which the task to be retrieved is updated to the task 5. In a similar manner, processing operations are executed up to the task 9, whereupon n becomes equal to 10 at the step 516. Thus, conditions n=nMAX is fulfilled at the step 518. The processing operation is then transferred to the task scheduler 242.

When no INTV IRQ is found at the step 508, the program proceeds to a step 520 at which step the program determines whether the IRQ in question is ENST IRQ. When the decision made at the step 508 is "NO", the IRQ must necessarily be ENST IRQ. Accordingly, the step 520 may be omitted and the program may proceed directly to the step 522 at which step the fuel pump is stopped in accordance with a specific program based on the engine stopping condition. Additionally, all the output signals for the ignition system and the fuel supply control system are reset. The program then returns to the start step 202 shown in FIG. 5.

FIG. 15 shows, in detail, a flow chart of a program for the task scheduler 242. At a step 530, it is decided whether the execution of the task "n" is needed. At first, n=1. Accordingly, a decision is made as to the necessity of TASK1 being executed. In other words, the presence of the task activation request is examined in the order of high to low priority levels. Such an examination can be made through the retrieval of a bit b6 or a flag Q and a bit b7 or a flag R of the respective task control words. Bit position b6 is allotted to the activation request flag. When a "1" is present at this position b6, it is determined that the activation request is present. Further, b7 is allotted for the flag indicating that the associated task is under execution. The presence of a "1" at b7 indicates that the associated task is under execution and is now being interrupted. Accordingly, when "1" is present at least one of b6 and b7, the scheduler program proceeds to a step 538.

At the step 538, the flag set at b7 is checked. The presence of "1" at b7 means that the execution is being interrupted. At a step 540, the execution being interrupted until then is resumed. Flags set at both b6 and b7 cause the decision at the step 538 to be affirmative or "YES", whereby the task program being interrupted is re-initiated. In the case where "1" is present only at b6, the activation request flag of the task is cleared at a step 542, which is followed by a step 544 where the flag is set at b7 (this flag will be hereinafter referred to as a RUN flag). The steps 542 and 544 show that the activation request for the task proceeds to the state in which the task is to be executed. Accordingly, at a step 546, the start address of the task program in concern is retrieved. This address can be determined from a start address tables TSA provided in ROM 104 in correspondence to TCWs of the various tasks. By jumping to the start address as determined, the execution of the task program of concern takes place.

Referring again to FIG. 15, when the decision at the step 530 is "NO", this means that neither activation is an request issued to the program of the task being retrieved nor is the program being momentarily interrupted. In this case, the scheduler program proceeds to the retrieval of the task to be executed next. In other words, the task n is incremented to (n+1). At this time, the program determines whether the incremented index (n+1) is MAX, i.e. (n+1)=10. If not, the scheduler program proceeds to the step 530. The above process is repeated until n has become equal to MAX or 10, whereupon the interrupted program for the background jobs is resumed at a step 536. In other words, it is confirmed at the step 536 that all the programs for the tasks 1 to 9 are not required to be executed, whereby the process returns to the point of the background job program at which the program has been interrupted in response to the appearance of IRQ.

FIG. 16 illustrates relationship between the task control words TCW, the TTM representing the task activation time internals or periods and task start address tables TSA provided in the ROM. In correspondence to the task control words TCW1 to TCW9, there are stored in ROM the task activating periods TTM1 to TTM9. For every INTV IRQ, COUNTERs are updated successively and a flag is set at b6 of the associated TCW upon coincidence between contents of the counter and TTM for the task. When the flag is thus set, the start address of the task is retrieved from the task start address TSA. A jump is made to the retrieved start address, whereby the selected one of the programs is executed. During the execution, a flag is set at b7 of the TCW in RAM 106 which corresponds to the program being executed. Thus, as far as this flag is set, the program determines that the associated program is being executed. In this way, the program for the task scheduler 242 shown in FIG. 5 is executed. As a consequence, one of the task programs 246 to 258 is executed. When IRQ is issued during the execution of the any task program, the execution is interrupted again to deal with the IRQ. Assuming that no IRQ is issued, the processing of the task being instantly executed will come to an end. Upon the termination of the execution of the task program, EXIT program 260 is next executed.

In the case of the exemplary embodiment being described, the tasks 12 and 13 are for the background jobs which are not activated by INTV IRQ. However, these tasks can be altered to the ones which can be activated by INTV IRQ. To this end, predetermined activation timings may be initially set at the task control words TCW 12 and TCW 13 corresponding to the tasks 12 and 13, while the bit values of TTMs 12 and 13 provided correspondingly to the tasks 12, 13 are set to "0". Thereafter, the steps 509 to 518 illustrated in FIG. 14 are repeated until n becomes equal to 11. To the contrary, when the task activated by INTV IRQ is to be altered to the task for the background job, the initial value of the counter of the corresponding TCW may be set to "0" so that the value of the counter will not coincide with the value of the corresponding TTM (i.e. "0") at the step 512. In this way, the tasks for the background jobs and the tasks activated by INTV IRQ can be arbitrarily altered to each other through corresponding modification only of the task programs to be altered without the necessity to alter the other programs. Further, selective alteration of the activating timings of the individual tasks activated by INTV IRQ can be effected without altering the other programs.

Since the task programs are provided independently from one another, alteration or modification of the contents of the individual task programs can be made without exerting an influence to the other program. Accordingly, in each of the task programs, it is possible to modify calculation formulas and/or add correction factors in dependence on the conditions under which the engine is operated.

Further, the method of determining the fuel injection quantity, ignition timing, etc. on the basis of proportional expressions may be replaced by the method in which maps are utilized, and vice versa.

Additionally, interrupts in synchronism with crankshaft rotation may be employed in place of the timer for activating the task program.

When only particular ones of the tasks are to be activated by timers, the activation periods as required are initially set at the counters of the associated TCWs while for the tasks to be inhibited from activation, initial values "0" are set at the counters of the corresponding TCWs.

The EXIT program 260 is illustrated in detail in FIG. 17. This program is composed of steps 562 and 564 for identifying the ended task. At the steps 562 and 564, retrieval is made successively starting from the task 1 to identify the ended task. At the next step 568, the flag RUN set at b7 of TCW corresponding to the ended task is reset, which means that the program for the identified task has been completely terminated. Control of the process is reacquired by the task scheduler 242, whereby the program next to be executed is determined.

Execution and interruption of a program will be described again by referring to FIG. 18. It is assumed now that the program for the background job which is assigned with the lowest priority is being executed. When an INTV IRQ is issued at time t1, the supervisory program or OS program is to be executed in place of the background job program, whereby it is determined that the tasks 1, 2 and 3 activated for every 10 m·sec. are requested to be executed, for example, through execution of the programs 224 and 242 illustrated in FIG. 5. Since the task 1 of the highest priority is first executed, a flag "1" is set at each of bit positions Q1, Q2, Q3 of TCW1, TCW2, TCW3 at time t2, while b6 of TCW1 or Q1 is cleared, whereby the program for the task 1 is executed. Assuming that a request for activating the program for the task 4 which is activated for every 20 m·sec. is also issued simultaneously, flag "1" is set also at b6 of TCW4 or Q4. However, the programs first to be executed are the programs for the tasks 1, 2 and 3 because of the higher priorities thereof than the task 4. When the execution of the program of task 1 is completed, the OS program is resumed to clear the flag at b7 of TCW1 or R1 and the request for executing the program of task 2 of the next high priority is accepted with preparation being made for the execution. Upon completed execution of the task 2, the OS program is resumed, and the flag at b7 of TCW2 or R2 is cleared, whereupon the program for the task 3 is allowed to be executed. When execution of the task 3 comes to an end, the OS program is resumed, and the flag at b7 of TCW3 or R3 is cleared. Then a request for executing the task 4 next to be executed is detected with a preparation for execution being made. This program begins to be executed at t4. Here, it is assumed that during the execution of the program of task 4 which takes a lot of time, a new INTV IRQ is issued. Then, the execution of the program of task 4 is interrupted at t5 and the OS program is resumed. When it is found that programs to be activated in response to the present INTV IRQ are the programs for the tasks 1, 2 and 3 assigned with the higher priorities than task 4, then the program for the task 1 is executed at time t6 because of the highest priority thereof. More specifically, flag "1" is set at b7 of TCW1, while flag at b6 thereof is cleared and the start address for the task 1 is retrieved from TSA1 to thereby allow the program for the task 1 to be executed. Thereafter, the tasks 2 and 3 are successively executed. When the task 3 comes to an end at a time point t7, resulting in that OS program is resumed to clear the flag "1" at b7 of TCW3 with the aid of EXIT program. Subsequently, through the task scheduler program 242 of OS program, another activation request or alternatively the program which is being interrupted is retrieved. Since the task 4 is interrupted, this program is again executed. The re-initiation of the task 4 is effected by feeding the contents of CPU 102 which have been set aside at a standby area at the time point t5 back again to CPU 102. The task 4 is thus re-started and comes to an end at a time point t9. Then, the OS program is resumed and the termination of the task 4 is indicated through execution of the EXIT program, i.e. clearing of flag "1" at b7 of TCW4.

In succession, the task scheduler program 242 is executed to search possible activation requests to the task programs as well as to the program being interrupted. For example, it is assumed that the flag "1" set at b6 of TCW7 corresponding to the task 7, which is activated for every 50 m·sec., is identified. Then, the start address for the task 4 is retrieved from TSA7 and a jump is made to the retrieved start address at which the task 7 program begins to be executed. At this time, flag at b6 of TCW7 is cleared while flag "1" is set at b7 of TCW7. When execution of the task 7 is completed at a time point t11, OS program is resumed, whereupon EXIT program is executed to clear the flag set at b7 of TCW7. Subsequently, another activation request for the task program as well as to the interrupted program are searched. When no program to which the activation request is issued or which is being interrupted is found, data of the background job program set aside at the standby area is fed back to CPU 102 to be processed. When INTV IRQ is issued at a time point t13, the contents existing in the CPU at that time are transferred to the standby area and the OS program is required to determine the program to which the INTV IRQ is issued to activate the processing through the associated program.

As will be appreciated from the above elucidation, whenever an interrupt request is issued, the program being executed is interrupted and the OS program is resumed to allow the program of the highest priority to be executed. In this manner, the program of more significance is allotted with the processing time with preference over less significant programs.

The manner in which one of the programs 246 to 258 is executed in accordance with the procedures described hereinbefore in conjunction with FIGS. 5 and 18 is illustrated in FIG. 19. In a standby state labelled by IDLE, no request to activate a program is issued. When the activation request is generated, a flag "1" is set at b6 of the associated TCW to indicate the necessity of activation. The time duration required for the shift from the state IDLE to QUEUE is determined in dependence on the task to which the activation request is issued. In the state QUEUE, a sequence of execution is determined in accordance with the priority allotted to the programs. In order to execute the program of concern, the flag at b6 of the associated TCW has to be beforehand cleared while the flag must be set at b7. The state in which program is executed is represented by RUN in FIG. 19. Upon termination of execution, the flag at b7 of the associated TCW is cleared to indicate the completed termination of the executed program. The state RUN is now replaced by the state IDLE for awaiting a next activation request. When IRQ is issued during execution of RUN of a program, the program has to be interrupted. The contents present at that time in the CPU are set aside at a standby area. This state is indicated by a label READY. When the interrupted program is to be executed again, the contents in the standby area are fed back again to CPU. In other words, the state READY is changed again to the state RUN. In this manner, each of the programs may take repeatedly the four states shown in FIG. 19. The flow shown in FIG. 19 is a typical one. It may happen that a flag "1" is set at b6 of TCW in the state READY. For example, this is the case in which a new activation request occurs in the very program that is being interrupted. Under this situation, the flag set at b7 is allotted with a higher preference over the flag set at b6. Accordingly, the task program being interrupted is first executed. When the flag at b7 is reset, the just executed program is shifted directly to the state QUEUE without assuming the state IDLE.

As will be appreciated from the foregoing description, the tasks assume necessarily one of the states illustrated in FIG. 19. In this connection, it is important to note that the state READY is present for each of the individual programs.

Accordingly, the standby area may be provided in correspondence to the individual task programs. In RAM 106 shown in FIG. 16, the standby area is provided in correspondence to the individual tasks. It will be understood that the program which is interrupted due to the interrupt request or to be replaced by another program for executing a desired subroutine is set aside at the standby area.

FIG. 20 illustrates the shifting in the state of the background job program. When an IRQ is issued during execution of this program, i.e. in the state RUN, the contents in the CPU are set aside at the relevant standby area, whereby the state READY is assumed. When the interrupt request has been processed, the contents in the standby area are fed back to the CPU, whereby the state RUN is resumed. The standby area as indicated in FIG. 20 can be used for this purpose.

Next, description will be made of individual task programs.

FIG. 21 is a flow chart of the INJ program which is activated at a time interval or period of 20 m·sec. At a step 570, the digital value QA representing the output signal from the air flow meter 24 and stored in RAM 106 through the execution of the task ADC2IN after A-D conversion is read out. At a step 572, the actual value of QA read out at the step 570 is compared with QA values set an $x_n$ of AF map provided in ROM 104 shown in FIG. 22, to thereby determine n of $x_n$ corresponding to the actual value of QA. FIG. 23 shows a scheme of the AF map. At a step 574, the engine speed data N stored in RAM through execution of the task RPMIN is read out. At a step 576, the actual value of N read out is compared with the values of N set at $y_n$ in the AF map, to thereby determine n of $y_n$ corresponding to the actual value of N. At a step 578, an address of the AF map is determined on the basis of $x_n$ and $y_n$ determined at the steps 572, respectively. The fuel supply quantity stored at the determined address is read out and placed in the register INJD 134 shown in FIG. 4 at a step 580.

FIG. 24 shows a flow chart of the program IGNCAL. At a step 586, the digital value QA representing the output from the air flow meter and stored in RAM through execution of the program ADC2IN is read out. At a step 588, the actual value of QA as read out is compared with values of QA set at $x_n$ of ADV map provided in ROM 104 as shown in FIG. 22, to thereby determine n of $x_n$ which corresponds to the actual value of QA. At a step 590, the engine speed data N stored in RAM through execution of RPMIN is read out. At a step 592, the actual value of N as read out is compared with values of N set at $y_n$ of the ADV map thereby to determine n of $y_n$ which corresponds to the actual value of N. At a step 594, an address in the ADV is determined on the basis of $x_n$ and $y_n$ determined at the steps 588 and 592, respectively. At a step 596, the ignition timing stored at the determined address is read out and placed in the register ADV 140 shown in FIG. 4.

The program HOSEI is provided for determining correction coefficients for temperatures of the atmosphere and cooling water, for example. Since these parameters undergo only slow changes, it is sufficient to determine the correction coefficients over a long interval.

The program ADC2IN is disclosed, for example, in U.S. Ser. No. 952,275 filed Oct. 18, 1978 now U.S. Pat. No. 4,280,189 in the name of Masao Takato et al under the title "Input Signal Processor Used in Electronic Engine Control Apparatus" and assigned to HITACHI LTD and U.S. Ser. No. 78,468 filed Sept. 24, 1979 now U.S. Pat. No. 4,297,881 in the name of Takao Sasayama et al under the title "Hot-Wire Flow Rate Measuring Apparatus" and assigned to HITACHI LTD.

The program RPMIN is disclosed in U.S. Ser. No. 952,275, for example.

The program DWLCAL is disclosed, for example, in U.S. application Ser. No. 121,476 filed Feb. 14, 1980 now U.S. Pat. No. 4,298,941 in the name of Toshio Furuhashi under the title "Method for controlling an internal combustion engine" and assigned to HITACHI LTD.

An example of the program ENST is disclosed in U.S. Ser. No. 952,531 filed Oct. 18, 1978 now U.S. Pat. No. 4,312,038 in the name of Masumi Iwai et al under the title "Electronic Engine Control Apparatus" and assigned to HITACHI LTD.

Next, description will be made of the background job on the assumption that EGRCAL and ISC are processed as the background jobs.

The program ISC is provided for controlling the opening degree of the air bypass valve 82 in the idling operation. FIG. 25 shows the details of this program.

When it is decided that the idle switch 148 is turned on by monitoring DIO 174 at a step 600, the first bit of the register DOUT 178 is set at level "L", whereby the air bypass valve 82 is designated. Thus, the air bypass valve is controlled in dependence on the value placed in the register EGRD 166. The air bypass valve 82 serving for controlling the air flow through the bypass passage is controlled for specific operating conditions. More particularly, in the case of operation at a low ambient temperature such as in winter, the starting operation in the cooled state of engine, operation under a large load due to the use of a car air-conditioner or the like, the air flow through the bypass passage is increased.

At a step 602, the duty factor of the air bypass valve is determined and set in the register EGRD 166 in dependence on the temperature of engine cooling water in accordance with the characteristic shown in FIG. 11.

At a step 604, the program determines whether the idle switch is closed or not. If the switch is closed, then an activation request flag for the program ISC is set at a step 606. In other words, bit "1" is set at Q10 of the task control word TCW10 of RAM shown in FIG. 16. Simultaneously, the first bit of the register DOUT of DIO 174 is set at level "L".

Subsequently, an end indication is issued.

On the other hand, when the idle switch is opened, an end indication is immediately made. Accordingly, this program is no longer executed. In this way, when the idle switch is closed at the step 606, the activation request flag for the program ISC is set and then the end indication is made. Accordingly, unless the interrupt request for executing another task such as TASK1 to TASK11 is issued, the program ISC is repeatedly executed. However, when IRQ is issued for another task, the execution of the ISC program is interrupted, to thereby execute the task program to which the IRQ is issued. Upon termination of the task program, the program ISC being interrupted is automatically resumed and executed.

FIG. 26 shows a flow chart of the program EGRCAL. When the idle switch is in the opened state, the air bypass valve 82 is not controlled, but the recirculation of exhaust gas is effected. To this end, the EGR system for controlling the exhaust gas recirculation quantity is driven. For driving the EGR system, the first bit in the register DOUT 178 of DIO is set to the level "H" at a step 610, whereby the EGR system 188 is driven in accordance with the value set at the register EGRD 166. Next, an arithmetic operation for determining EGR quantity is carried out. At a step 612, the program determines whether the cooling water temperature TW is higher than a predetermined value TA °C. If the answer is affirmative, the EGR operation is inhibited or interrupted. To this end, zero is set at the EGRD register for effecting EGR CUT at a step 616. When the cooling water temperature TW is found to be lower than the predetermined value (TA °C.), the program proceeds to the step 614 where the program determines whether the temperature TW of cooling water is lower than a predetermined value TB °C. If so, then the EGR operation is inhibited. To this end, zero is set at the EGRD register at a step 616. The temperature TA at the step 612 represents the upper limit, while the temperature TB at the step 614 represents the lower limit. Only when the temperature TW of the engine cooling water lies in the range between TA and TB, is the EGR operation carried out. Namely, the program proceeds to a step 618 where the EGR quantity is arithmetically determined on the basis of the suction air quantity QA and the revolution number N of the engine crankshaft through the map retrievals. The map employed for this retrieval is provided in ROM 104 at addresses B601 to B700, as shown in FIG. 16. The retrieved values are set at the register EGRD. In this manner, the valve for EGR is opened in dependence on the value placed in the register EGRD and the duty cycle previously set in the register EGRP, whereby the EGR operation is carried out.

At a step 622, the program determines whether the idle switch is in the closed state by monitoring the DIO 174. When the idle switch is opened, an activation request flag for the program EGRCAL is set. In other words, the bit "1" is set at Q11 of the task control word TCW11 of RAM. Further, the first bit of the register DOUT 178 of the DIO is set at the level "H".

Subsequently, an end indication is made.

On the other hand, when the idle switch is closed, the end indication is immediately issued.

In this manner, the program EGRCAL is processed as the background job as in the case of the program ISC in the sense that the activation request for this program is set by itself and then the end indication is made. When these programs for the background jobs are to be altered to the programs to be processed through INTV IRQ, the step 606 in the case of the program ISC is omitted while the step 604 is executed before the step 600, so that the steps 600 and 602 are executed only when the idle switch is closed. Additionally, the activation timing or period as desired is initially set at the COUNTER 10 of the task control word TCW 10 of RAM 106 corresponding to the program ISC. A similar procedure may be used for altering the program EGRCAL to the program activated by INTV IRQ.

On the contrary, when a task program is to be altered to a background job program, bit "0" is initially set in the counter of the TCW corresponding to that task, while an activation request flag "1" is set at b6 of the TWC corresponding to the task at the end of the task program, which may then proceed to the EXIT step.

Thus, a task program may be changed between a background job program and the program activated by INTV IRQ by modifying only the program desired to be changed and the contents of associated TCW and TTM without modifying other programs.

As described hereinbefore, INTV IRQ is generated according to the teaching of the invention so that all the arithmetic operations for control may be carried out independently of the engine speed. An arrangement of a circuit for generating the IRQ is schematically shown in FIG. 27. In this figure, flip-flops 739, 745, 762, 766 constitute respective bits of the MASK register 200 in FIG. 4 and flip-flops 740, 746, 764, 768 constitute respective bits of the STATUS register 198. Referring to this figure, a register 735 is loaded with data for setting the timer interrupt period (e.g. 10 m·sec.) from the CPU through a data bus 752, while a counter 736 is concurrently supplied with clock pulses CLOCK. The data contents placed in the register 735 are compared with the count output from the counter 736 through a comparator 737 which produces an output signal upon coincidence of the contents between the register 735 and the counter 736. The output signal from the comparator 737 is used to set flip-flops 738 and 740. Simultaneously with the setting of the flip-flops 738 and 740, an output signal is produced from AND circuit 747, whereby the counter 736 as well as the flip-flop 738 are reset. When a flip-flop 739 is set, the timer interrupt signal IRQ is produced through an AND circuit 748 and an OR circuit 751. The flip-flop 739 serves to mask the timer interrupt signal IRQ when this signal is unnecessary. At that time, the flip-flop 739 is supplied with a reset command from CPU.

On the other hand, an ENST interrupt request, which is to be generated when the engine is stopped accidentally or due to a fault is produced through a circuit arrangement similar to that for the timer interrupt, which comprises a register 741, a counter 742, a comparator 743, AND circuits 749 and 750, and flip-flops 745 and 746. The signal supplied to the counter 742 is, however, the one generated during rotation of the engine crankshaft. This signal is the reference angular signal REF produced from the sensor 146 shown in FIG. 4 and may be produced for every rotation of 180° of the crank shaft in the case of a four-cylinder internal combustion engine. Since the counter 742 is reset when the signal REF is produced, no ENST interrupt signal can be generated. However, when the engine is stopped for the reasons described above, the REF signal will disappear, whereby the counter 742 is released from the reset state. Thus, the ENST interrupt signal can be generated in the manner described above in conjunction with the generation of the timer interrupt signal.

The timer interrupt signal IRQ triggers the activation of tasks as illustrated in the flow chart of FIG. 5, whereby the tasks are processed in accordance with the allotted priority levels. Namely, upon reception of an interrupt request, the CPU analyses the cause for the received interrupt request. When the interrupt request is determined to be a timer interrupt, the tasks 246 to 258 allotted with priority are activated and the task selected through the task scheduler 242 is executed. When the execution of task is terminated, a corresponding indication is made through the execution of EXIT program. In response to the next timer interrupt signal, the task next to be executed is selected through the task scheduler.

Upon the appearance of the ENST interrupt signal, the fuel pump as well as the ignition system are turned off. All the input/output control circuits are disabled.

In a similar manner, upon the occurrence of ADC1 END IRQ or ADC2 END IRQ, a flip-flop 764 is set to "1", when the sequence of operation of ADC1 have been terminated. When a flip-flop 762 is set to "1" from the CPU through the bus 752, an AND gate 770 is then enabled to produce a service request signal to the CPU for dealing with ADC1 END IRQ. However, when the flip-flop 762 is not set to "1", ADC1 END IRQ is inhibited. The same applies to ADC2. Upon the termination of sequence operation of ADC2, the flip-flop 768 is set to "1". When a flip-flop 766 is set to "1" at that time, ADC2 END IRQ is generated through an AND gate 772 and the OR gate 751. On the other hand, unless the flip-flop 766 is set to "1", the AND gate 772 remains disabled, resulting in no ADC2 END IRQ of being generated. In this manner, only when the flip-flop 739, 745, 762 and/or 766 is set to "1", is an associated IRQ issued and vice versa.

FIG. 28 shows in detail EGRC 164 shown in FIG. 4. The content of the register ERGD shown in FIG. 4 represents the width of a pulse and corresponds to a register 168 shown in FIG. 28. Further, there is provided a register 168 which corresponds to EGRP.

It is assumed now that a bit "H" is set at a bit position b0 in a mode register 190. Then, both AND gates 184 and 816 are enabled. A timer 804 constituted by a counter circuit counts clock signal from the AND gate 816. The count value B is compared with the contents placed in the register 168 through a comparator 810. When the count value B is increased beyond the value C stored in the register 168, the timer 804 is reset. In this manner, the timer 804 repeats the counting operation at a period determined by the value C stored in the register 168.

The count value of the timer 804 is compared with the value stored in the register 166 through a comparator 808. When the count value B of the timer counter 804 is smaller than the value A set in the register 166, a flip-flop 812 is set. On the other hand, when the value B is greater than A, the flip-flop 812 is reset. In this manner, the time interval during which the flip-flop 812 is in the set state is determined by the value A stored in the register 166. By increasing the value A, the duration of the set state of the flip-flop 812 is correspondingly increased.

Since the counting operation of the timer 804 is repeated at a frequency corresponding to the value set at the register 168, the set output of the flip-flop 812 is repeatedly produced at a frequency corresponding to the value set at the register 168 and is output through the AND gates 182 and 184 enabled by the bit of level "H" at b0 of the mode register 190 if the input DI01 to the AND gate 182 is level "H".

When the bit at the bit position b0 of the mode register 190 is set at level "L", the AND gates 184 and 816 are disabled or blocked, whereby the output from the flip-flop 812 is interrupted and, at the same time, the input to the timer 804 is also interrupted.

By supplying the control data to the MODE register shown in FIG. 4 from the CPU, the start or stop of operation of the circuit shown in FIG. 28 can be controlled. In the case of the circuit shown in FIG. 28, the AND gates 184 and 816 are controlled by the bit at the position b0 of the mode register which bit is destined to control the EGRC 164 shown in FIG. 4.

FIG. 29 shows in detail a circuit arrangement of the IGNC 139 in FIG. 4. Data for controlling the time point at which the primary winding of the ignition coil is energized is loaded in the DWL register from CPU, while data for the ignition timing is set in the ADV register. It is assumed now that the value set in the DWL register 142 is represented by A, while the set value of the ADV register 140 is represented by C.

Assuming that the bit at the bit position b1 of the mode register 190 is at the "H" level, the AND gates 144 and 860 are then enabled, i.e. they are in the conducting state, whereby POS pulses are applied to the counter 850 through AND gate 860. Consequently, the count value of the counter 850 is increased as a function of the engine crank angle and is cleared by the REF (reference) pulse. The count value at which the counter 850 is cleared by the REF pulse is represented by B.

When the value A set in the DWL register 142 is greater than B, the output from the comparator 852 is supplied through OR gate to the flip-flop 856 to reset the latter. Consequently, no pulse output is produced from the AND gate 144. When the count value of the counter 850 is increased beyond the value A set in the DWL register 142, the flip-flop 856 is set by the output pulse from the AND gate 864. The set output from the flip-flop 856 is then applied to a ignition system through AND gate 144, as the result of which a current flows through the primary winding of the ignition coil. When the count value is further increased, the flip-flop 856 is again reset by the output signal (C≦B) from the comparator 854. Then, the pulse output from the AND gate 144 is interrupted, resulting in the generation of spark for ignition.

FIG. 30 shows in detail an arrangement of the DIO 174 described hereinbefore in conjunction with FIG. 4. The signal from the bit position of DDR 176, at which the bit "H" is set, is applied to the associated one of tristate drivers 872 to 886, whereby the associated tristate driver becomes conductive. As a consequence, bit of DOUT 178 which corresponds to the bit "H" in DDR is output through the associated tristate driver. On the other hand, signals present at lines DI00 to DI07 can be arbitrarily read by the CPU through buffer amplifiers 892 to 904. The signals present at the lines corresponding to the non-conducting ones of the tristate drivers 872 to 886 depend on the external conditions. Accordingly, the external conditions are read for these lines.

FIG. 31 shows in detail an arrangement of the INJC 132 shown in FIG. 4. The REF pulse derived from the output of the crank angle sensor is produced at a predetermined crank angle (e.g. 80° or 90°) before reaching the top dead center (TDC). The relationship between the top dead center (TDC) of the crankshaft and the REF pulse is illustrated in FIG. 32 at (A) and (B). On the assumption that the bit at the bit position b4 of the mode register 190 is at the "H" level, gates 910, 912 and 138 are in the conducting state. Accordingly, the count value of a counter 904 is cleared by every REF pulse, as is illustrated in FIG. 32 at (C). A register 902 functions to receive and hold the value A from the CPU. This value A is utilized to determine the point in time at which the fuel injection is initiated. The value A is compared with the count value B through the comparator 906 to set a flip-flop 908.

When the flip-flop 908 is set, a pulse is supplied to the injection valve 12 through the AND gate 138. The gate 912 is opened, whereby a timer 916 constituted by a counter counts the clock pulses. A register 134 corresponds to the INJD register shown in FIG. 4. During a time interval corresponding to a value C set in this register, the injection valve is opened. More particularly, as long as the count value D of the timer 916 is smaller than the set value C, the flip-flop 920 is set. However, when C≦D, the flip-flop 920 is reset to block the AND gate 138. Thus, the injection pulse is interrupted.

In the manner described above, the point in time for initiating fuel injection as well as the opening duration of the fuel injection valve can be controlled.

By setting the bit at the bit position b4 of the mode register 190 to zero ("L" level), the AND gate 138 is blocked and all the operations can be stopped.

As listed in the Table 1, the priorities of programs are determined in dependence on the functions of the tasks, wherein interval activation requests are issued in accordance with their priority. In this manner, main tasks for controlling engine operation are activated at predetermined intervals independently of the rotational speed of the engine crankshaft. Accordingly, the load imposed on the CPU may remain substantially constant to assure control with high reliability and performance.

According to the invention, the software flags IST and EM are provided to discriminate the before-start state, the starting state and the after-start state from one another, wherein two different activations, i.e. the activation request Q for the task program MONIT and the soft timer activation T are adopted upon the transition from the before-start state to the starting state during which the starter motor is driven, while two different activations i.e. the activation request Q for the task programs INJ, DWLCAL and IGNCAL and the soft timer activation T are adopted upon transition from the starting state to the after-start state, whereby the starting performance is significantly enhanced.

Further, because the individual task programs are adapted to be executed independently from one another, it is possible to set the activation periods arbitrarily for each of the task programs and, additionally, to alter or modify the contents of the individual tasks without exerting an influence on the contents of the other task programs. In addition, alteration of the tasks to the timer-activated programs and/or to the background job programs can be made in an arbitrary manner.

We claim:

1. A method of electronically controlling the operation of an internal combustion engine provided with a control system which includes sensors for detecting operating conditions of said engine, an arithmetic unit for arithmetically determining control quantities for controlling said engine through the digital processing of output signals produced from said sensors, memory means for storing therein programs and data for performing said arithmetic operations, and control means for controlling said engine on the basis of the results of said arithmetic operations, wherein contents of said arithmetic operations are divided into a number of tasks in dependence on control functions to be performed, said method comprising:
   a first step of setting the indication of an activation request for a given one of said tasks through the execution of another task;
   a second step of setting the indication of an activation request for a task through the execution of said task itself;
   a third step of searching the set of the activation request indications for the individual tasks; and
   a fourth step of executing the tasks for which the activation requests are retrieved on the basis of the generation of the retrieved activation requests.

2. A method according to claim 1, wherein plural tasks are associated with respective activation periods in dependence on the effects of said tasks in controlling said engine, said method further including a fifth step of generating an interrupt signal periodically at a predetermined time interval, and wherein said third step comprises the steps of identifying that task among the plural tasks to be activated by said interrupt signal to which the activation request indication is to be set, and searching the task to be executed at first among those to which said activation request is set in accordance with their effects in controlling said engine.

3. A method according to claim 2, wherein said identifying step comprises counting said interrupt signal and determining the task which has reached the activation timing by comparing the counted value of said interrupt signal with said activation periods.

4. A method according to claim 2, wherein said step includes the step of checking the presence of the activation request indication sequentially from the task to be executed preferentially through a counting operation and a comparing operation.

5. A method according to claim 2, wherein said fourth step includes the steps of clearing the activation request indication for the task to be executed, and setting a run indication for the task and then executing the task.

6. A method according to claim 5, wherein said fourth step further includes clearing the run indication for the task which has been executed and activating again said third step.

7. A method according to claim 5, wherein said second step includes the step of clearing the run indication for a pregiven task which has been executed and setting the activation request indication to said pregiven task and then activating said third step.

8. A method according to claim 2, further including a fifth step of detecting a change in the starting operating condition of said engine, and a sixth step of executing at least one of said first step and said identifying step for a pregiven task in response to the result of said fifth step.

9. A method according to claim 8, wherein said fifth step comprises detecting the turn-on of a power source and turn-on and turn-off of a starter switch, and said sixth step includes the steps of executing said first step for a pregiven task in response to the detection of the turn-on of the power source, executing said first step and said identifying step for a selected task in response to the detection of the turn-on of the starter switch, and executing said first step for a pregiven task and simultaneously executing said identifying step for all tasks activated by said interrupt signal except for the selected task, in response to the detection of the turn-off of the starter switch.

10. A method according to claim 9, wherein said fourth step includes the step of setting the activation request indications for arithmetic calculation corrections and the calculation of initial fuel quantity and ignition timing tasks by the execution of a data fetch task in response to the turn-on of the power source.

11. A method according to claim 10, wherein said fourth step includes the steps of setting the activation request indications for said data fetch task and a task for calculating fuel quantity and ignition timing for starting the engine and executing a decision step for a task for calculating fuel quantity and ignition timing for starting the engine and an air flow representative data fetching task by the execution of a task for calculating initial fuel quantity and ignition timing in response to the turn-on of the starter switch.

12. A control method according to claim 11, wherein said fourth step includes the steps of setting the activation request indications for tasks for calculating the duty cycle for controlling the fuel-air ratio, ignition timing and the time at which current supplied to the ignition will be initiated and executing said identifying step for all the tasks activated by said interrupt signal except for said task for calculating fuel quantity and ignition timing for starting the engine by the execution of that task in response to the turn-off of the starter switch.

13. A method of operating a processor-controlled system in which output signals are produced as a result of the processor carrying out a plurality of tasks, the functions of which affect the operation of said system, and in which there are provided a plurality of task programs through the execution of which said tasks are performed, selected ones of said task programs having associated therewith an execution request signal capable of being repetitively generated in accordance with a respective timing pattern, comprising the steps of:
  (a) for a first prescribed operational state of said system, causing the generation of execution request signals for a prescribed one of the selected ones of said task programs in accordance with its respective timing pattern; and
  (b) for a second prescribed operational state of said system, causing the generation of an execution request signal for a predetermined one of the selected ones of said task programs independently of its respective timing pattern.

14. A method according to claim 13, wherein step (b) comprises causing the generation of execution request signals for predetermined ones of the selected ones of said task programs independently of their respective timing patterns.

15. A method according to claim 14, wherein step (b) comprises the steps of:
  (b-1) in response to said system acquiring said second prescribed operational state, causing the generation of execution request signals for said predetermined ones of the selected ones of said task programs independently of their respective timing patterns, and
  (b-2) thereafter, causing the generation of execution request signals for said predetermined ones of the selected ones of said task programs in accordance with their respective timing patterns.

16. A method according to claim 14, further comprising the step (c) of
  for a third operational state of said system, causing the generation of execution request signals for preselected ones of the selected ones of said task programs independently of their respective timing patterns.

17. A method according to claim 16, wherein step (c) comprises the steps of:
  (c-1) in response to said system acquiring said third operational state, causing the generation of execution request signals for said preselected ones of said task programs independently of their respective timing patterns, and
  (c-2) thereafter, causing the generation of execution request signals for said preselected ones of the selected ones of said task programs in accordance with their respective timing patterns.

18. A method according to claim 13, wherein step (a) comprises the step of causing the repetitive generation of said execution request signal in accordance with its respective timing pattern.

19. A method according to claim 13, further comprising the step (c) of causing the generation of execution request signals for prescribed ones of said task programs in response to the generation of said execution request signals for said prescribed one of the selected ones of said task programs.

20. A method according to claim 13, wherein step (b) comprises the steps of:
- (b-1) in response to said system acquiring said second prescribed operational state, causing the generation of an execution request signal for said predetermined one of the selected ones of said task programs independently of its respective timing pattern, and
- (b-2) thereafter, causing the generation of execution request signals for said predetermined one of the selected ones of said task programs in accordance with its respective timing pattern.

21. A method according to claim 13, further comprising the step (c) of
for a third operational state of said system, causing the generation of an execution request signal for a preselected one of the selected ones of said task programs independently of its respective timing pattern.

22. A method according to claim 21, further comprising the step (d) of
for at least one of said second and third operational states of said system, causing the generation of an execution request signal for a designated one of the selected ones of said task programs in accordance with its respective timing pattern.

23. A method according to claim 21, wherein step (c) comprises the steps of:
- (c-1) in response to said system acquiring said third operational state, causing the generation of an execution request signal for said preselected one of the selected ones of said task programs independently of its respective timing pattern, and
- (c-2) thereafter, causing the generation of an execution request signal for said preselected one of the selected ones of said task programs in accordance with its respective timing pattern.

24. A method according to claim 21, wherein said system comprises an internal combustion engine having a starting switch through the operation of which the engine power source is coupled to the engine control system and the engine is started, and wherein said first prescribed operational state of said engine corresponds to the application of power to the engine control system prior to the turning on of the engine by the operation of said starting switch.

25. A method according to claim 24, wherein said second prescribed operational state corresponds to the period during which said engine is being started by the operation of said starting switch.

26. A method according to claim 25, wherein said third prescribed operational state corresponds to the normal running state of the engine subsequent to the starting state of the engine.

27. A method according to claim 26, wherein said engine comprises sensor means for generating output signals representative of operating conditions of the engine in response to which said processor carries out said plurality of tasks, and wherein said prescribed one of the selected ones of said task programs comprises a program for coupling data representative of output signals generated by said sensor means to said processor.

28. A method according to claim 27, wherein said predetermined one of the selected ones of said task programs comprises a program for determining the quantity of fuel and ignition timing required for starting the engine or a program for coupling data representative of output signals generated by said sensor means to said processor.

29. A method according to claim 28, wherein said preselected ones of the selected ones of said task programs comprise programs for determining the duty cycle for controlling the fuel-air ratio for said engine, for determining ignition timing, and for determining the time at which the supply of current to the engine ignition coil is to be initiated.

30. A method according to claim 27, further comprising the step (d) of causing the generation of execution request signals for preestablished ones of said task programs in response to the generation of execution request signals for said prescribed one of the selected ones of said task programs.

31. A method according to claim 30, wherein said preestablished ones of said task programs include a program for determining the initial quantity of fuel and ignition timing for said engine to be employed upon said engine acquiring said second operational state.

32. A method according to claim 30, further comprising the step (e) of for at least one of said second and third operational states of said engine, causing the generation of an execution request signal for a designated one of the selected ones of said task programs in accordance with its respective timing pattern, said designated task program comprising a program for coupling data representative of output signals from sensor means for detecting the flow of air to said engine to said processor.

33. A method according to claim 13, wherein said system comprises an internal combustion engine having a starting switch through the operation of which the engine power source is coupled to the engine control system and the engine is started, and wherein said first prescribed operational state of said engine corresponds to the application of power to the engine control system prior to the turning on of the engine by the operation of said starting switch.

34. A method according to claim 33, wherein said second prescribed operational state corresponds to the period during which said engine is being started by the operation of said starting switch.

35. A method of operating a processor-controlled system in which output signals are produced as a result of the processor carrying out a plurality of tasks, the functions of which affect the operation of said system, and in which there are provided a plurality of task programs through the execution of which said tasks are performed, comprising the steps of:
- (a) generating interrupt signals associated with said task programs in response to which said processor is to execute said programs;
- (b) selectively storing in memory an execution request signal for the task program associated with an interrupt signal; and
- (c) searching said memory for the presence of execution request signals and causing the execution of a selected task program for which an execution request signal has been stored in step (b); and wherein step (b) includes the step of inhibiting the storage in memory of an execution request signal for a selected task program.

36. A method according to claim 35, wherein step (b) includes the step of selectively storing in memory a signal for inhibiting the storage of an execution request signal, and storing in memory an execution request signal for a task program, associated with an interrupt signal, for which an inhibiting signal has not been stored.

37. A method according to claim 35, wherein each task program has a prescribed level of priority assigned thereto in accordance with its functional effect on the operation of said system, and step (b) comprises the step of:

storing in memory respective task control words associated with the respective levels of priority of said task programs and in accordance with which the execution of said task programs is controlled, a first prescribed segment of each task control word being indicative as to whether or not there is an execution request signal for a task program of that level.

38. A method according to claim 37, wherein step (b) further comprises:

providing in each respective task control word, a second prescribed segment representative of whether or not the storage of an execution request signal in said first prescribed segment is to be inhibited.

39. A method according to claim 38, wherein step (b) further comprises:

in response to said second prescribed segment of said task control word not inhibiting the storage of an execution request signal, providing a third prescribed segment of that respective task control word to be representative of the execution interval of an associated task program;

sequentially modifying the contents of said third prescribed segment; and in response to the contents of said third prescribed segment of said task control word reaching a value indicative of the time of occurrence of the execution of said task, causing the contents of said first prescribed segment of said task control word to be representative of an execution request signal.

40. A method according to claim 39, wherein said second and third prescribed segments of a task control word are the same.

41. A method according to claim 39, wherein said causing step of step (b) comprises comparing the contents of said third prescribed segment of said task control word with a reference code associated with said respective task program, and causing the contents of said first prescribed segment of said task control word to be representative of said execution request signal in response to the coincidence of the contents of said third prescribed segment of said task control word and said reference code.

42. A method according to claim 35, wherein said processor-controlled system comprises a combustion engine control system having sensor means for supplying engine condition signals representative of operating conditions of the engine in response to which said processor carries out said plurality of tasks, and wherein each task program has a prescribed level of priority assigned thereto in accordance with its functional effect on the operation of said system and is comprised of a plurality of sub-tasks each associated with a respective engine function corresponding to a respective effect on engine operation.

43. A method according to claim 35, wherein step (b) comprises the steps of:

storing in memory first data in accordance with which execution request signals are to be generated and second data associated with respective ones of said task programs;

successively modifying said second data; and in response to respective second data defining a prescribed relationship with respective first data, causing a respective execution request signal to be stored in memory.

44. A method according to claim 43, wherein said first data have a prescribed order of arrangement in memory corresponding to the order of arrangement of said second data.

45. A method according to claim 43, wherein step (c) further includes the step of storing in memory the starting address of a program and beginning the execution of the task program to be executed by referencing its associated starting address.

46. A method according to claim 45, wherein, in memory, the order of arrangement of respective starting addresses of task programs associated with respective execution request signals corresponds to the order of arrangement of said second data.

47. A method according to claim 46, wherein said first data have a prescribed order of arrangement in memory corresponding to the order of arrangement of said second data.

48. A method according to claim 35, wherein step (c) further includes the step of terminating the issuance of an execution request signal associated with the task program which is executed in step (c).

49. A method of operating a processor-controlled system in which output signals are produced as a result of the processor carrying out a plurality of tasks, the functions of which affect the operation of said system, in which there are provided a plurality of task programs through the execution of which said tasks are performed, selected ones of said task programs having associated therewith an execution request signal capable of being repetitively generated in accordance with a respective timing pattern, comprising the step of:

(a) upon the occurrence of at least a first prescribed operational state of said system, causing the generation of an execution request signal for a predetermined one of the selected ones of said task programs independently of its respective timing pattern, while initiating the production of execution request signals therefor in accordance with its respective timing pattern.

50. A method according to claim 49, wherein said system comprises an internal combustion engine having a starting switch through the operation of which the engine power source is coupled to the engine control system and the engine is started, and wherein the occurrence of said first prescribed operational state of said engine corresponds to the turning on of the engine by the operation of said starting switch.

51. A method according to claim 50, wherein step (a) is carried out upon the occurrence of first and second prescribed operational states of said engine, the occurrence of said second prescribed operational state corresponding to the turning off of said starting switch subsequent to the starting of the engine.

52. A method according to claim 50, wherein said predetermined one of the selected ones of said task programs comprises a program for determining the quantity of fuel and ignition timing required for starting the engine.

53. A method according to claim 50, wherein said engine comprises sensor means for generating output signals representative of operating conditions of the engine in response to which said processor carries out said plurality of tasks, and wherein a prescribed one of the selected ones of said task programs comprises a program for coupling data representative of output signals generated by said sensor means to said processor, and further comprising the step of:

(b) during the starting of the engine, causing the generation of an execution request signal for said prescribed one of the selected ones of said task programs at a frequency higher than that at which the execution request signal is generated subsequent to starting of the engine.

54. A method according to claim 53, wherein said engine comprises analog-digital conversion means, coupled to said sensor means, for generating digital data representative of the output signals generated by said sensor means, and said prescribed program comprises a program for coupling data from said analog-digital conversion means to said processor.

55. A method according to claim 50, wherein said predetermined ones of said task programs include a program for determining the initial quantity of fuel and ignition timing for said engine to be employed during the starting of said engine.

56. A method according to claim 49, wherein said system comprises an internal combustion engine having a starting switch through the operation of which the engine power source is coupled to the engine control system and the engine is started, and wherein the occurrence of said first prescribed operational state of said engine corresponds to the turning off of said starting switch subsequent to the starting of the engine.

57. A method according to claim 56, wherein said predetermined one of the selected ones of said task programs comprises one of the programs for determining the duty cycle for controlling the fuel-air ratio for said engine, for determining ignition timing, and for determining the time at which the supply of current to the engine ignition coil is to be initiated.

58. A method according to claim 49, wherein said system comprises an internal combustion engine, and including sensor means for generating output signals representative of operating conditions of the engine in response to which said processor carries out said plurality of tasks, and wherein a prescribed one of the selected ones of said task programs comprises a program for coupling data representative of output signals generated by said sensor means to said processor, and a predetermined one of said task programs comprises a program for calculating engine operation calculation correction data, and further comprising the steps of:

(b) causing the generation of an execution request signal for said prescribed one of the selected ones of said task programs in accordance with a respective timing pattern; and (c) causing the generation of an execution request signal for said predetermined one of said task programs in response to a prescribed number of successive generations of the execution request signal for said prescribed task program.

59. A method according to claim 58, wherein said engine comprises analog-digital conversion means, coupled to said sensor means, for generating digital data representative of the output signals generated by said sensor means, and said prescribed program comprises a program for coupling data from said analog-digital conversion means to said processor.

60. A method of electronically controlling the operation of an internal combustion engine provided with a control system which includes sensors for detecting operating conditions of said engine, an arithmetic unit for arithmetically determining control quantities for controlling said engine through the digital processing of output signals produced from said sensors, memory means for storing therein programs and data for performing said arithmetic operations, and control means for controlling said engine on the basis of the results of said arithmetic operations, wherein contents of said arithmetic operations are divided into a number of tasks in dependence on control functions to be performed, said method comprising:

a first step of setting the indication of an activation request for a given one of said tasks through the execution of another task;

a second step of searching the set of the activation request indications for the individual tasks; and a third step of executing the tasks for which activation requests are retrieved on the basis of the generation of retrieved activation requests.

61. A method according to claim 60, further including a fourth step of detecting a change in the starting operating condition of said engine, and a fifth step of executing said first step in response to the result of said fourth step.

62. A method according to claim 61, wherein said fourth step comprises detecting the turn-on of a power source and turn-on and turn-off of a starter switch, and said fifth step includes the steps of executing said first step for a pregiven task in response to the detection of the turn-on of the power source, executing said first step in response to the detection of the turn-on of the starter switch, and executing said first step for a pregiven task in response to the detection of the turn-off of the starter switch.

63. A method according to claim 62, wherein said third step includes the step of setting activation request indications for arithmetic calculation corrections and the calculation of initial fuel quantity and ignition timing tasks by the execution of a data fetch task in response to the turn-on of the power source.

64. A method according to claim 63, wherein said third step includes the steps of setting activation request indications for said data fetch task and a task for calculating fuel quantity and ignition timing for starting the engine and executing a decision step for a task for calculating fuel quantity and ignition timing for starting the engine and an air flow representative data fetching task by the execution of a task for calculating initial fuel quantity and ignition timing in response to the turn-on of the starter switch.

65. A control method according to claim 64, wherein said third step includes the steps of setting activation request indications for tasks for calculating the duty cycle for controlling the fuel-air ratio, ignition timing and the time at which current supplied to the ignition will be initiated.

66. A method of electronically controlling the operation of an internal combustion engine provided with a control system which includes sensors for detecting operating conditions of said engine, an arithmetic unit for arithmetically determining control quantities for controlling said engine through the digital processing of output signals produced from said sensors, memory means for storing therein programs and data for performing said arithmetic operations, and control means for controlling said engine on the basis of the results of said arithmetic operations, wherein contents of said arithmetic operations are divided into a number of tasks in dependence on control functions to be performed, said method comprising:
- a first step of setting the indication of an activation request for a task through the execution of said task itself;
- a second step of searching the set of activation request indications for the individual tasks; and
- a third step of executing the tasks for which activation requests are retrieved on the basis of the generation of retrieved activation requests.

67. A method according to claim 66, further including a fourth step of detecting a change in the starting operating condition of said engine, and a fifth step of executing said first step for a pregiven task in response to the result of said fourth step.

68. A method according to claim 67, wherein said fourth step comprises detecting the turn-on and turn-off of a starter switch, and said fifth step includes the steps of executing said first step for a selected task in response to the detection of the turn-on of the starter switch, and executing said first step for all tasks activated by an interrupt signal except for the selected task, in response to the detection of the turn-off of the starter switch.

69. A method according to claim 68, wherein said fourth step comprises detecting the turn-on of a power source and said third step includes the step of setting activation request indications for arithmetic calculation corrections and the calculation of initial fuel quantity and ignition timing tasks by the execution of a data fetch task in response to the turn-on of the power source.

70. A method according to claim 69, wherein said third step includes the steps of setting activation request indications for said data fetch task and a task for calculating fuel quantity and ignition timing for starting the engine and executing a decision step for a task for calculating fuel quantity and ignition timing for starting the engine and an air flow representative data fetching task by the execution of a task for calculating initial fuel quantity and ignition timing in response to the turn-on of the starter switch.

71. A control method according to claim 70, wherein said third step includes the steps of setting the activation request indications for tasks for calculating the duty cycle for controlling the fuel-air ratio, ignition timing and the time at which current supplied to the ignition will be initiated and executing said first step for all the tasks activated by said interrupt signal except for said task for calculating fuel quantity and ignition timing for starting the engine by the execution of that task in response to the turn-off of the starter switch.

* * * * *